United States Patent

Tani

[11] Patent Number: 5,808,975
[45] Date of Patent: Sep. 15, 1998

[54] OPTICAL STORAGE APPARATUS

[75] Inventor: Hiroshi Tani, Kawasaki, Japan

[73] Assignee: Fujitsu Limited, Kawasaki, Japan

[21] Appl. No.: 789,951

[22] Filed: Jan. 27, 1997

[30] Foreign Application Priority Data

Aug. 19, 1996 [JP] Japan .................................. 8-217096

[51] Int. Cl.⁶ .................................................. G11B 17/22
[52] U.S. Cl. .............................................. 369/32; 369/44.34
[58] Field of Search ................................... 369/32, 44.28, 369/44.34, 215, 219, 216, 224; 360/75, 77.2, 77.04, 78.04, 78.05, 78.07

[56] References Cited

U.S. PATENT DOCUMENTS

| 5,189,653 | 2/1993 | Yanagi | 369/44.32 |
| 5,202,865 | 4/1993 | Yanagi | 369/32 |
| 5,285,435 | 2/1994 | Takasago | 369/44.28 |

FOREIGN PATENT DOCUMENTS

| 63-029380 | 2/1988 | Japan . |
| 64-076471 | 3/1989 | Japan . |
| 8102074 | 4/1996 | Japan . |

Primary Examiner—Tan Dinh
Attorney, Agent, or Firm—Greer, Burns, Crain, Ltd.

[57] ABSTRACT

A bias current measuring unit measures a drive current which is supplied to a VCM when a carriage is moved to a plurality of measurement positions and held as a bias current to remove a mechanical offset that is applied to the carriage and stores into a storing unit. A bias current operating unit obtains a corresponding bias current Vd with reference to the storing unit on the basis of a carriage position during a seeking operation and adds the bias current Vd to a seek current Vs which is supplied to the VCM, and removes a disturbance component which is caused by a mechanical offset due to a friction between a bearing and a rail, a tension by an FPC, and the like.

25 Claims, 30 Drawing Sheets

FIG. 2
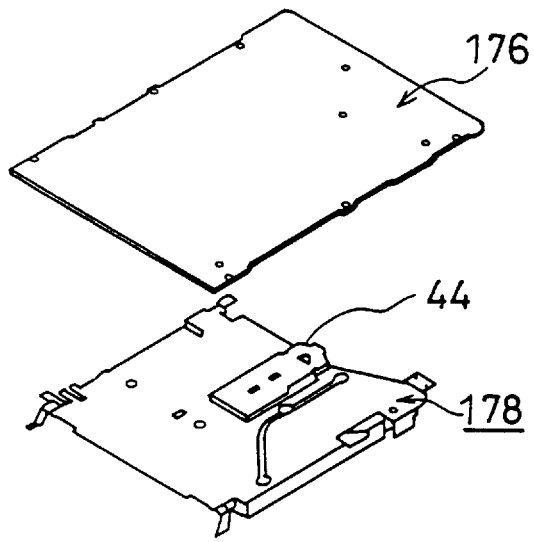
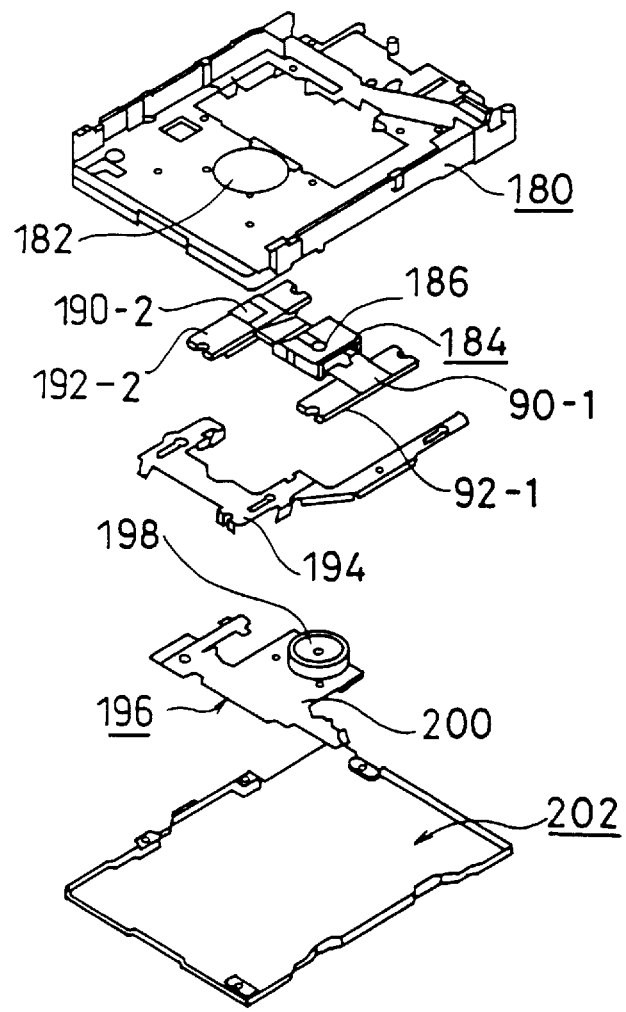

MEDIUM
INSERTING
DIRECTION

MEDIUM
INSERTING
DIRECTION

FIG. 8

| MEASURING MODE | MEASURING POSITION | POSITION CONTROL UPON MEASUREMENT | MEASUREMENT VCM CURRENT |
|---|---|---|---|
| 1 | TRACK NUMBER | TRACKING SERVO IS ON. DOUBLE SERVO IS ON. | DOUBLE SERVO CURRENT |
| 2 | TRACK NUMBER | CARRIAGE POSITION LOCKING SERVO IS ON. TRACKING SERVO IS OFF. | POSITION LOCK CURRENT |
| 3 | CARRIAGE POSITION SENSOR VALUE | TRACKING SERVO IS ON. DOUBLE SERVO IS ON. | DOUBLE SERVO CURRENT |
| 4 | CARRIAGE POSITION SENSOR VALUE | CARRIAGE POSITION LOCKING SERVO IS ON. TRACKING SERVO IS OFF. | POSITION LOCK CURRENT |

F I G. 9

| CONTROL MODE | MEASURING MODE | TABLE REFERENCE VALUE | BIAS CURRENT OPERATION |
|---|---|---|---|
| A | MODE 1 OR 2 | TRACK NUMBER Tn | LINEAR INTERPOLATION |
| B | MODE 1 OR 2 | TRACK NUMBER Tn | ADJACENT APPROXIMATION |
| C | MODE 3 OR 4 | CARRIAGE POSITION SENSOR VALUE Pn | LINEAR INTERPOLATION |
| D | MODE 3 OR 4 | CARRIAGE POSITION SENSOR VALUE Pn | ADJACENT APPROXIMATION |

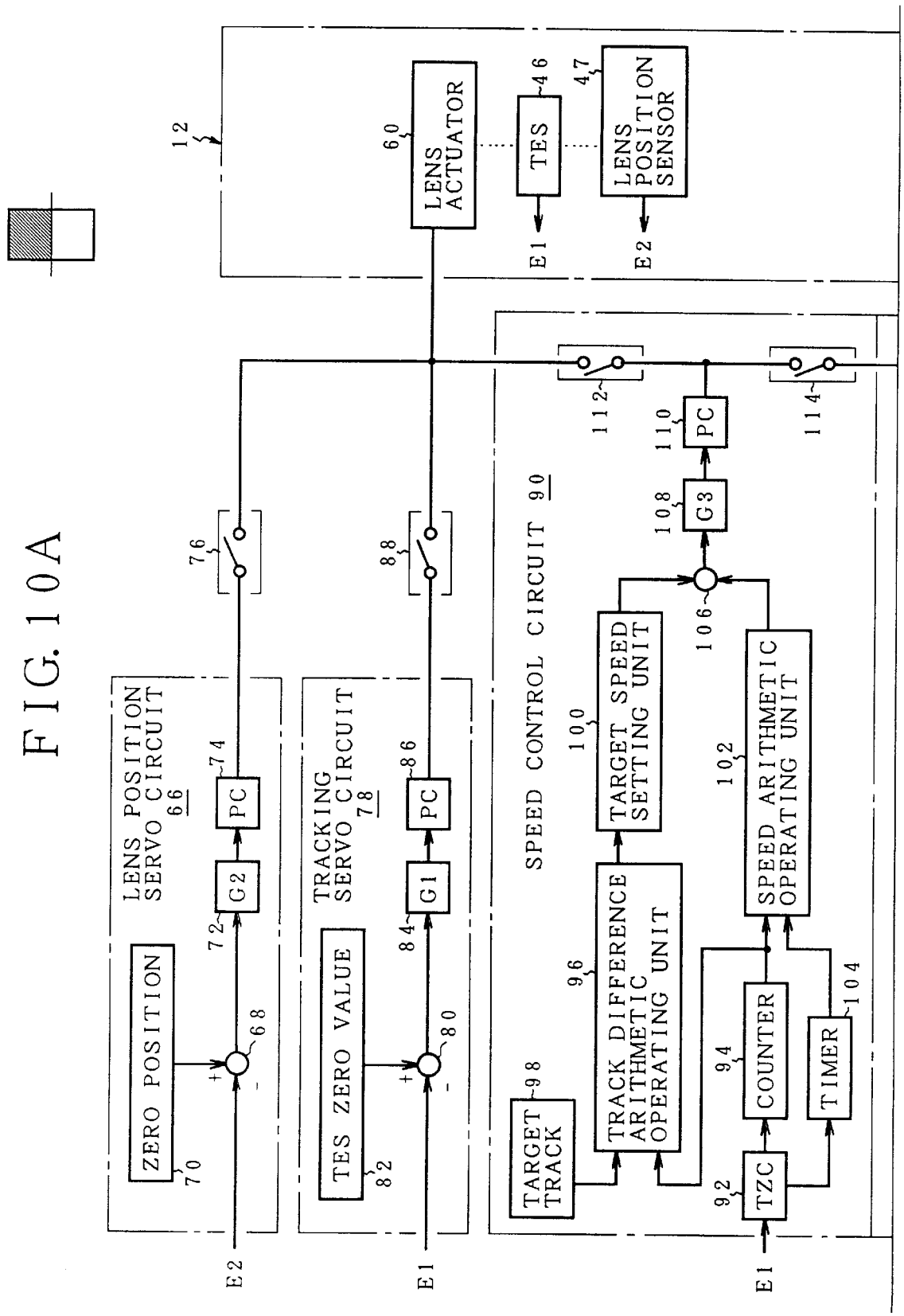

FIG. 12

| TRACK NO. Tn | VCM BIAS VALUE Vn |
|---|---|
| T1 | V1 |
| T2 | V2 |
| T3 | V3 |
| T4 | V4 |
| T5 | V5 |
| T6 | V6 |
| T7 | V7 |
| T8 | V8 |
| T9 | V9 |
| T10 | V10 |
| T11 | V11 |
| T12 | V12 |

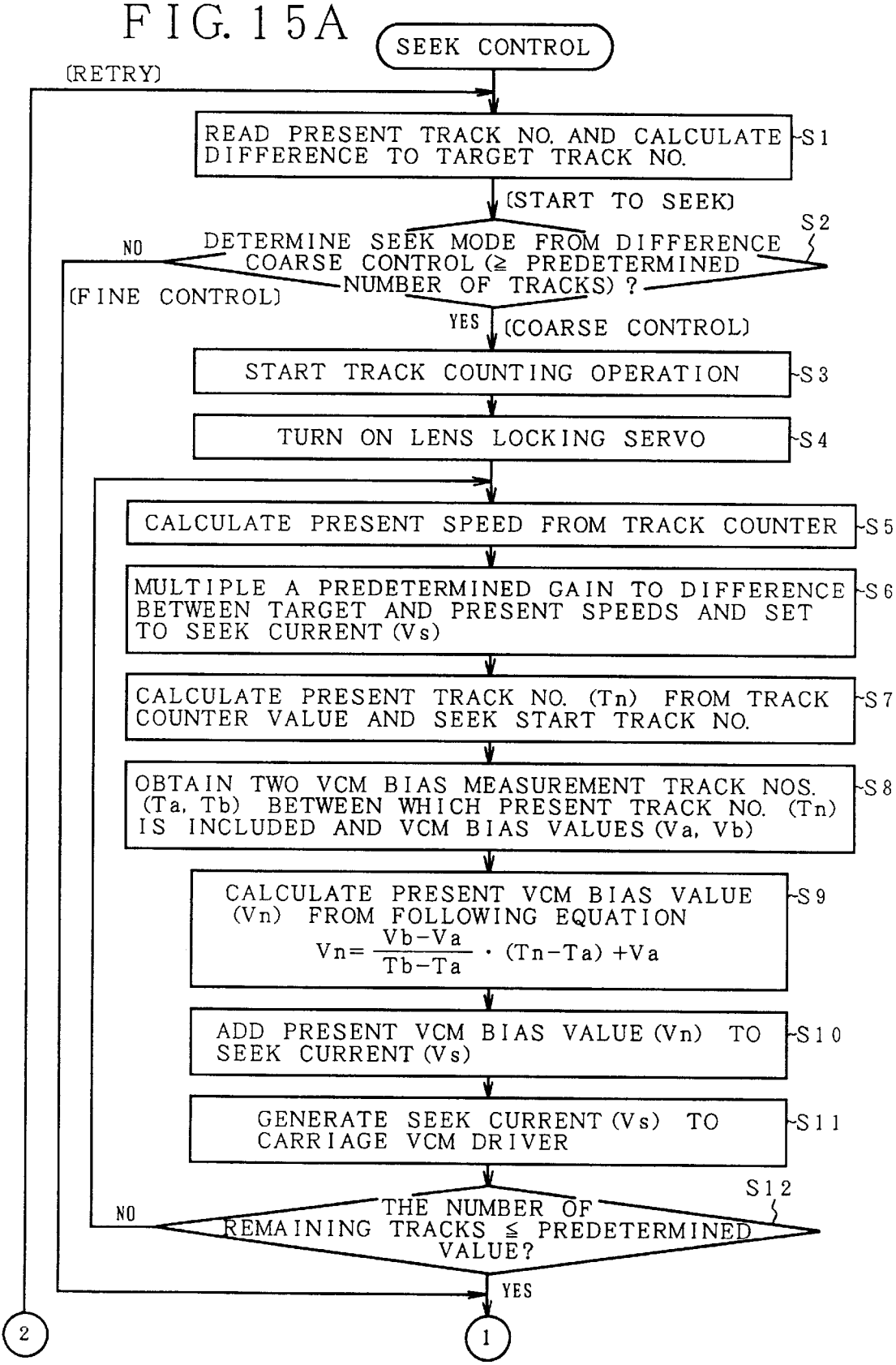

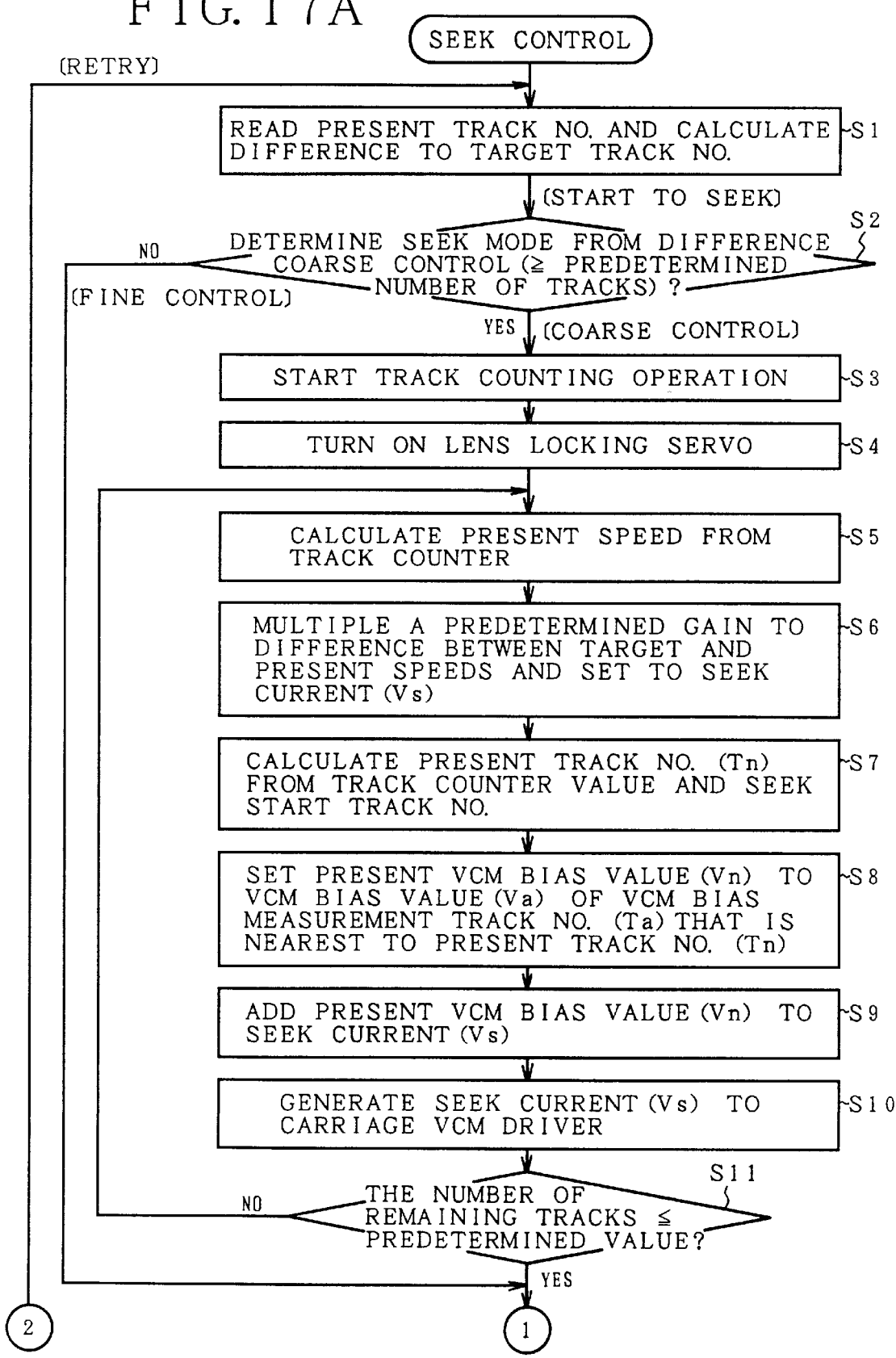

FIG. 19

| CARRIAGE POSITION Pn | VCM BIAS VALUE Vn |
|---|---|
| P1 | V1 |
| P2 | V2 |
| P3 | V3 |
| P4 | V4 |
| P5 | V5 |
| P6 | V6 |
| P7 | V7 |
| P8 | V8 |
| P9 | V9 |
| P10 | V10 |
| P11 | V11 |
| P12 | V12 |

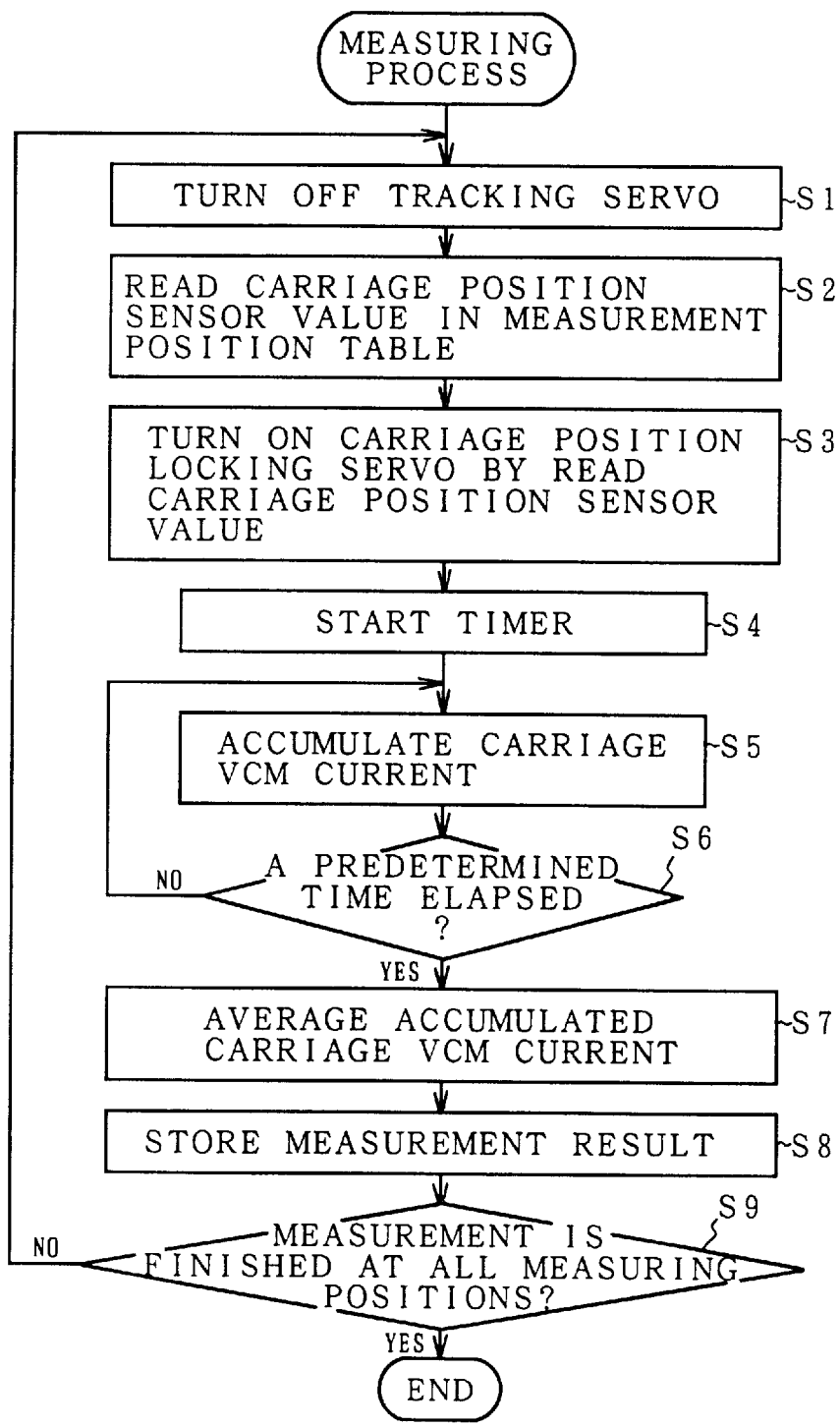

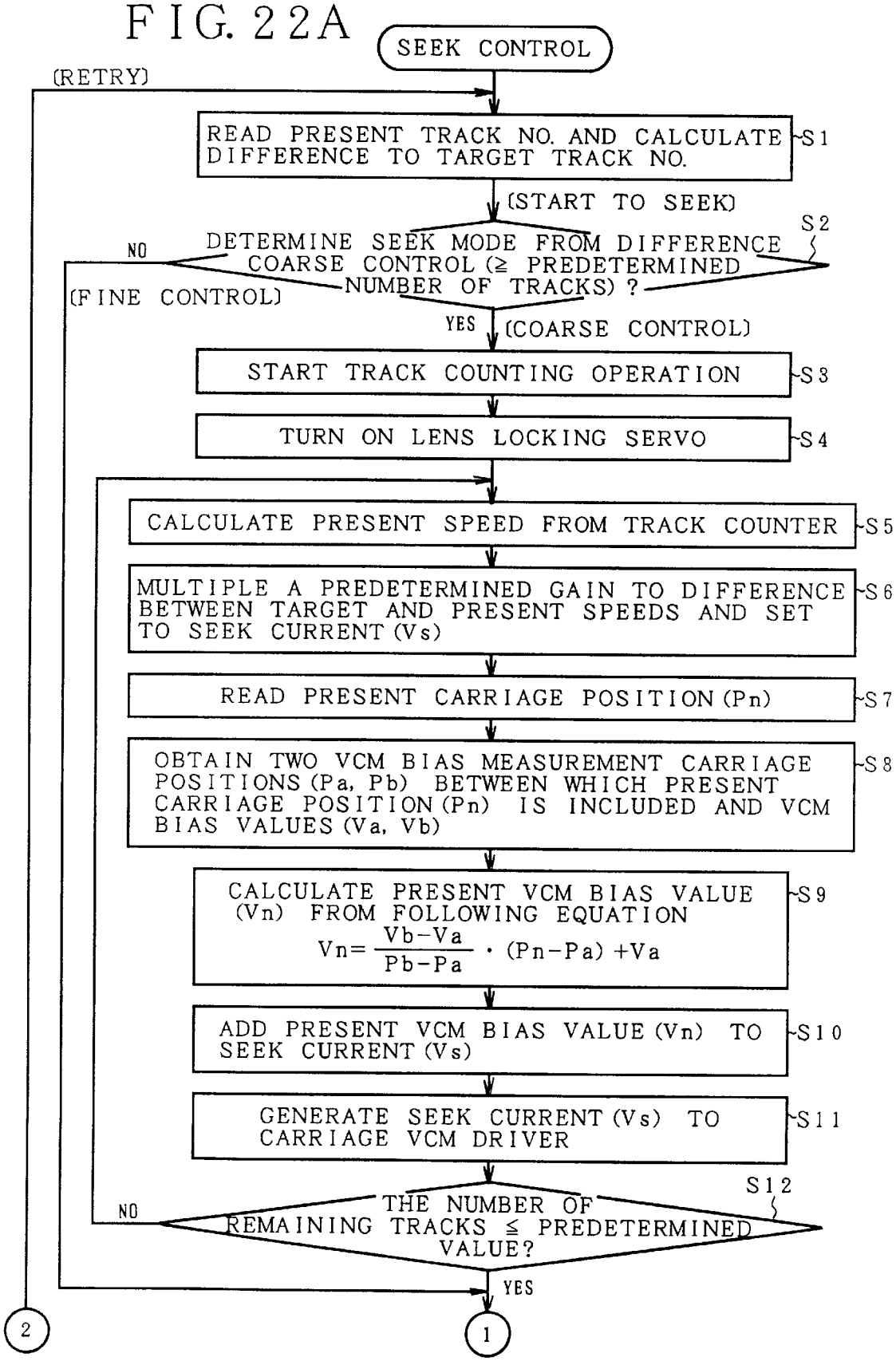

OPTICAL STORAGE APPARATUS

BACKGROUND OF THE INVENTION

The present invention relates to an optical storage apparatus for optically recording and reproducing information to/from an exchangeable medium such as an MO cartridge or the like and, more particularly, to an optical storage apparatus for enabling a stable seek control to be executed for a mechanical offset in association with a reduction in weight of a carriage.

Attention is paid to an optical disk as a storage medium as a center of multi-media which is rapidly developing in recent years. For example, as for an MO cartridge of 3.5 inches, MO cartridges of 128 MB, 230 MB, and the like are provided. An optical disk drive using such an MO cartridge is provided as an external storage apparatus of a desk-top type personal computer. Further, it is also strongly desired to use the optical disk drive in a notebook-sized personal computer having an excellent portability which is rapidly spread in recent years. In order to equip an optical disk drive as a standard of an external storage apparatus, it is necessary to miniaturize and thin the optical disk drive. For example, a thickness of an HDD or FDD which is presently installed in a desk-top type personal computer is equal to about 17 mm, and it is also necessary to make an optical disk drive thin to a similar extent.

The optical disk drive has a pickup mechanism of a linear driving type in the direction which traverses tracks on a medium. The pickup mechanism is constructed by a fixed optical unit and a movable optical unit mounted on a carriage which is linearly driven by a VCM. The movable optical unit is equipped with a lens actuator and has a relatively complicated mechanism in which a two-dimensional degree of freedom to move an objective lens in the direction traversing the tracks by a current supply to a tracking coil and to move the objective lens in the vertical direction by a current supply to a focusing coil. Further, the lens actuator can move the objective lens to the inner side or the outer side by only a micro distance around a position where the center of the objective lens is made coincide with the optical axis of a light beam from the fixed optical unit as a center by the current supply to the tracking coil. A lens position sensor is usually mounted in order to detect an optical axial deviation amount of the lens from a neutral position of the lens. With respect to a carriage which is driven by the VCM as mentioned above and on which the lens actuator, lens position sensor, and the like are mounted as well, a large reduction in weight is promoted by simplifying the structure as much as possible in association with the miniaturization and thinning of the apparatus.

As a result of the reduction of the mass of the carriage in association with the miniaturization and thinning of the optical disk drive, however, mechanical reactions such as friction between a bearing and a rail for moving the carriage in the radial direction of a medium, a tension by an FPC (Flexible Print Circuit) band for connecting a casing and the carriage by a signal line, and the like cannot be ignored in a seek control. Especially, the friction between the bearing and the rail and the tension of the FPC band for signal line connection have variations in every apparatus and have different values in accordance with the position of the carriage. There is a possibility that they are also different depending on a temperature in the apparatus. In the conventional seek control, therefore, although a value that is obtained by multiplying a difference between a target speed and a measured present speed with a gain is used as a control current, a mechanical disturbance amount depending on the carriage position is not considered in the control operation. Consequently, when the carriage mass is small, the apparatus enters an unstable control state, that there is a problem of reduction in seek performance.

SUMMARY OF THE INVENTION

According to the invention, there is provided an optical storage apparatus which enables a stable seek control even if there is an influence by a mechanical offset such as friction, tension, or the like in association with a reduction in weight of a carriage.

An optical storage apparatus of the invention comprises: a lens actuator for moving an objective lens through which a light beam is irradiated to a medium in the direction which traverses tracks on the medium; a carriage actuator (VCM) for moving a carriage on which the lens actuator is mounted in the direction transverse to the tracks on the medium; and a seek control unit for moving the light beam to a target track position by driving the carriage actuator and the lens actuator. According to the invention, such an optical storage apparatus has at least a storing unit, a bias current operating unit, and a correcting unit. The storing unit stores a bias current which is obtained by measuring drive currents that are supplied to the carriage actuator when the carriage is moved and held at a plurality of measurement positions in the radial direction of the medium and which eliminate a mechanical offset applied to the carriage. The bias current operating unit obtains a corresponding bias current by referring to the storing unit on the basis of the present position of the carriage during the seeking operation by the seek control unit. The correcting unit corrects the drive current which is supplied to the carriage actuator by the bias current. Further, according to the invention, there is provided a bias current measuring unit. The bias current measuring unit measures the drive currents flowing in the carriage actuator when the carriage is moved and held to the plurality of measurement positions in the radial direction of the medium and stores a bias current for eliminating the mechanical offset to be applied to the carriage into the storing unit. As mentioned above, the carriage is moved to a predetermined measurement position, the bias current which is necessary to hold the position is supplied to the carriage actuator and is measured and stored, the bias current corresponding to the present position is obtained during the seeking operation, and the seek current is corrected. Thus, the disturbance amount that is caused by the mechanical offset due to the friction between the bearing and the rail of the carriage, the tension by the FPC band, and the like can be eliminated and a stable seeking operation can be executed.

There are the following four measuring modes for the measurement of the bias current measuring unit.

(Measuring mode 1)

In the measuring mode 1, the bias current measuring unit allows the light beam to seek the measurement track of the medium which is designated by a track number Tn. After completion of the seek, a tracking servo of the lens actuator is turned on, thereby allowing the light beam to trace the track. Simultaneously, a double servo of the carriage actuator is turned on and a double servo current is supplied to the carriage actuator so that the position of the objective lens detected by a lens position sensor is held to the neutral position (zero position). The double servo current is measured as a bias current at a measurement position which is necessary to eliminate the mechanical offset, and is stored into the storing unit.

(Measuring mode 2)

In the measuring mode 2, the bias current measuring unit allows the light beam to seek the measurement track of the medium which is designated by the track number Tn. After completion of the seeking operation, a carriage position servo of the carriage actuator is turned on in the OFF state of the tracking servo, and a position lock current is supplied to the carriage actuator so as to hold the detecting position of a carriage position sensor. The position lock current is measured as a bias current at a measurement position which is necessary to eliminate the mechanical offset, and is stored into the storing unit.

(Measuring mode 3)

In the measuring mode 3, the bias current measuring unit designates a measurement position which can be detected by the carriage position sensor, and drives the carriage actuator to the measurement position by turning on the carriage servo. After completion of movement of the carriage to the measurement position, the carriage position servo is turned off and the tracking servo is simultaneously turned on, thereby allowing the light beam to trace the track. Further, by turning on the double servo of the carriage actuator, the double servo current is supplied to the carriage actuator so that the position of the objective lens detected by the lens position sensor is held to the neutral position. The double servo current is measured as a bias current at the measurement position which is necessary to eliminate the mechanical offset and is stored into the storing unit.

(Measuring mode 4)

In the measuring mode 4, the bias current measuring unit designates the measurement position which can be detected by the carriage position sensor and allows the carriage to be moved to a measurement position by turning on the carriage position servo of the carriage actuator. After completion of the movement, the position lock current is supplied to the carriage actuator so as to hold the measurement position. The position lock current is measured as a bias current at the measurement position which is necessary to eliminate the mechanical offset and is stored into the storing unit. The bias current measuring unit measures the bias current of the carriage actuator a plurality of times at measurement positions and obtains the mean value. For example, a PSD (Position Sensing Device) for detecting the absolute position of the carriage moving on a rail of a casing or the like is used as a carriage position sensor. The bias current measuring unit measures the bias current in an adjusting step after completion of the assembly of the apparatus, and stores the bias current values into the storing unit. The bias current can be also measured upon activation of the apparatus, in an initializing process after the medium was loaded, or in a command waiting time and can be stored into the storing unit.

The correcting unit controls the speed of the carriage actuator and simultaneously adds a bias current value, obtained by referring to the storing unit, to a seek current which is supplied to the carriage actuator by a coarse control during the coarse control for locking the objective lens to the neutral position by the lens actuator. The correcting unit also controls the speed of the lens actuator and simultaneously adds the bias current value, obtained by referring to the storing unit, to a double servo current which is supplied to the carriage actuator by a fine control during the fine control for locking the objective lens to the neutral position by the carriage actuator. More specifically, the seek control is divided into a long seek in which a track difference to the target track is equal to or larger than a specified value and a short seek in which the track difference to the target track is less than the specified value. The long seek is divided into the coarse control for controlling the speed of the carriage, the fine control for controlling the speed of the lens actuator, and a deceleration control for pulling in the light beam to the target track. The short seek comprises the fine control and the deceleration control. During the fine control, the carriage actuator is subjected to the double servo for driving the carriage so as to keep the objective lens at the neutral position. The correcting unit consequently adds a bias current value Vn obtained by referring to the storing unit to a seek current Vs which is supplied to the carriage actuator during the coarse control. On the contrary, during the fine control, the bias current value Vn obtained by referring to the storing unit is added to a double servo current Vd which is supplied to the carriage actuator.

In the measuring modes 1 and 2, the bias current operating unit refers to the storing unit on the basis of the number Tn of the present track which is being sought, reads out bias current values measurement track numbers locating on both sides of the present track number, and calculates the bias current value of the present track number by a linear interpolation. The bias current operating unit refers to the storing unit on the basis of the number of the present track which is being sought and selects the bias current value of the measurement track number which is closer to the present track number between the measurement track numbers located on both sides of the present track number. In the measuring modes 3 and 4, the bias current operating unit refers to the storing unit on the basis of the present position detected by the carriage position sensor during the seeking operation, reads out the bias current values at measurement positions on both sides of the present position, and calculates the bias current value at the present position by linear interpolation. The bias current operating unit refers to the storing unit on the basis of the present position detected by the carriage position sensor during the seeking operation and selects the bias current value at the measurement position closer to the present position between the measurement positions on both sides of the present position. A nonvolatile memory in which the contents are not deleted even if a power source of the apparatus is turned off is used as a storing unit for storing the measured bias current value.

The above and other objects, features, and advantages of the present invention will become more apparent from the following detailed description with reference to the drawings.

BRIEF DESCRIPTION OF THE DRAWINGS

FIG. 2 is an assembly exploded diagram of the apparatus of FIG. 1;

FIG. 8 is an explanatory diagram of a bias current measuring mode in the invention;

FIG. 9 is an explanatory diagram of a seek control mode in the invention;

FIGS. 10A and 10B are functional block diagrams of a seek control unit of the invention corresponding to measuring modes 1 and 2;

FIG. 12 is an explanatory diagram of a measurement position table which is formed in the measuring mode 1 in FIG. 11;

FIGS. 15A and 15B are flowcharts for a seek control of the invention according to a control mode A of a linear interpolation corresponding to the measuring modes 1 and 2;

FIGS. 17A and 17B are flowcharts for a seek control of the invention according to a control mode B of an adjacent approximation corresponding to the measuring modes 1 and 2;

FIG. 19 is an explanatory diagram of a measurement position table which is formed in the measuring mode 3 in FIGS. 18A and 18B;

FIG. 21 is a flowchart for a measuring process in the measuring mode 4 of the invention;

FIGS. 22A and 22B are flowcharts for a seek control of the invention according to a control mode C of a linear interpolation corresponding to the measuring modes 3 and 4.

DETAILED DESCRIPTION OF THE PREFERRED EMBODIMENTS

[Structure of apparatus]

Figure 1:
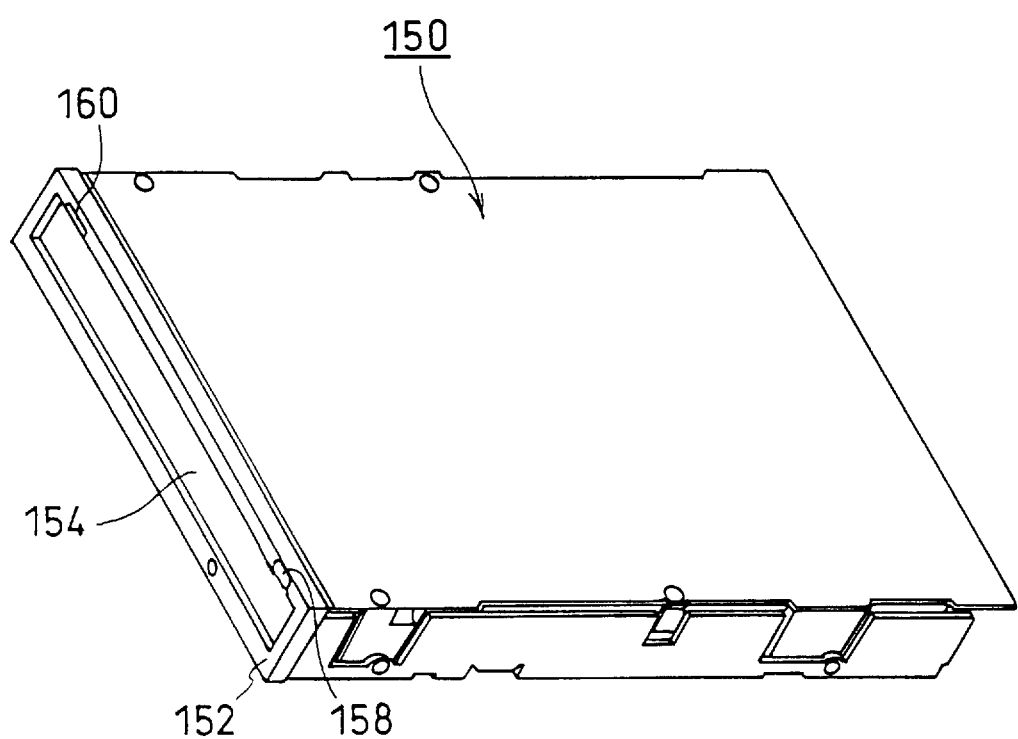
FIG. 1 is an external view of an apparatus of the invention.

FIG. 1 is an explanatory diagram of an external view of an optical storage apparatus, namely, an optical disk drive of the invention. A front vessel 152 in which a medium inserting slot is opened is provided in a front portion of a drive main body 150. A door 154 is attached to the medium inserting slot of the front vessel 152 so as to be rotatable around upper portions on both sides as axes and is urged in the closing direction by a built-in spring. Therefore, the door is opened and closed in association with the insertion and ejection of an MO cartridge medium. An ejection button 158 and an operation display LED 160 are provided around the front vessel 152. A height of the front vessel 152 is set to about 17 mm and a height of the drive main body 150 is set to be slightly lower than that.

FIG. 2 is an assembly exploded diagram of the drive main body 150 in FIG. 1. The drive main body 150 is constructed by a printed circuit board 176, a cartridge holder 178, a drive base 180, a lens carriage 184, a slide plate 194, a spindle unit 196, and a cover 202 from the upper side. Among them, the component elements from the drive base 180 to the lower cover 202 are further shown in FIG. 3 as an assembly exploded diagram of a state seen from the back side.

In FIG. 2, a control circuit necessary for control of the drive main body 150 is installed on the printed circuit board 176. A medium enclosing space is formed between the cartridge holder 178 and the drive base 180 locating in the lower portion, thereby positioning the MO cartridge medium inserted from the front side. An electromagnet 44 is also attached to the cartridge holder 178. The lens carriage 184, slide plate 194, and spindle unit 196 are attached to the drive base 180. The lens carriage 184 constructs a movable optical system and an objective lens 186 is installed on the lens carriage 184. A laser beam from a fixed optical unit 208 provided on the bottom portion side of the drive base 180 in FIG. 3 enters the objective lens 186. A beam spot is irradiated to the medium locating at an upper position. A return light is returned to the fixed optical unit 208. Coil portions 190-1 and 190-2 of a VCM are arranged on both sides of the lens carriage 184. The coil portions 190-1 and 190-2 are arranged through gaps in magnetic yoke portions 192-1 and 192-2 which are fixedly arranged. Therefore, by supplying currents to the coil portions 190-1 and 190-2, linear motors are formed between the coil portions 190-1 and 190-2 and the magnetic yoke portions 192-1 and 192-2. The lens carriage 184 can be made operative in the direction traverse to the tracks on the medium. A lens actuator for moving the objective lens 186 in the direction traverse to the tracks on the medium and a focusing actuator for performing a focusing control by moving the objective lens 186 in the optical axial direction are mounted on the lens carriage 184. The slide plate 194 attaches a medium hub to a turntable 198 located under the spindle unit 196 in association with the insertion of the MO cartridge medium. When ejecting the MO cartridge medium, by driving an ejection motor unit 204 in FIG. 3, the slide plate 194 is integratedly moved in the depth direction for the drive base 180 in FIG. 2. The turntable 198 is moved downward, thereby releasing the locking state with the medium. The MO cartridge medium is ejected by a spring provided for the cartridge holder 178. In the spindle unit 196, the turntable 198 is attached onto a plate 200. A spindle motor is assembled in the turntable 198. In the spindle unit 196, by assembling the plate 200 to the lower side of the drive base 180, the turntable 198 is located in an opening 182.

Figure 4:
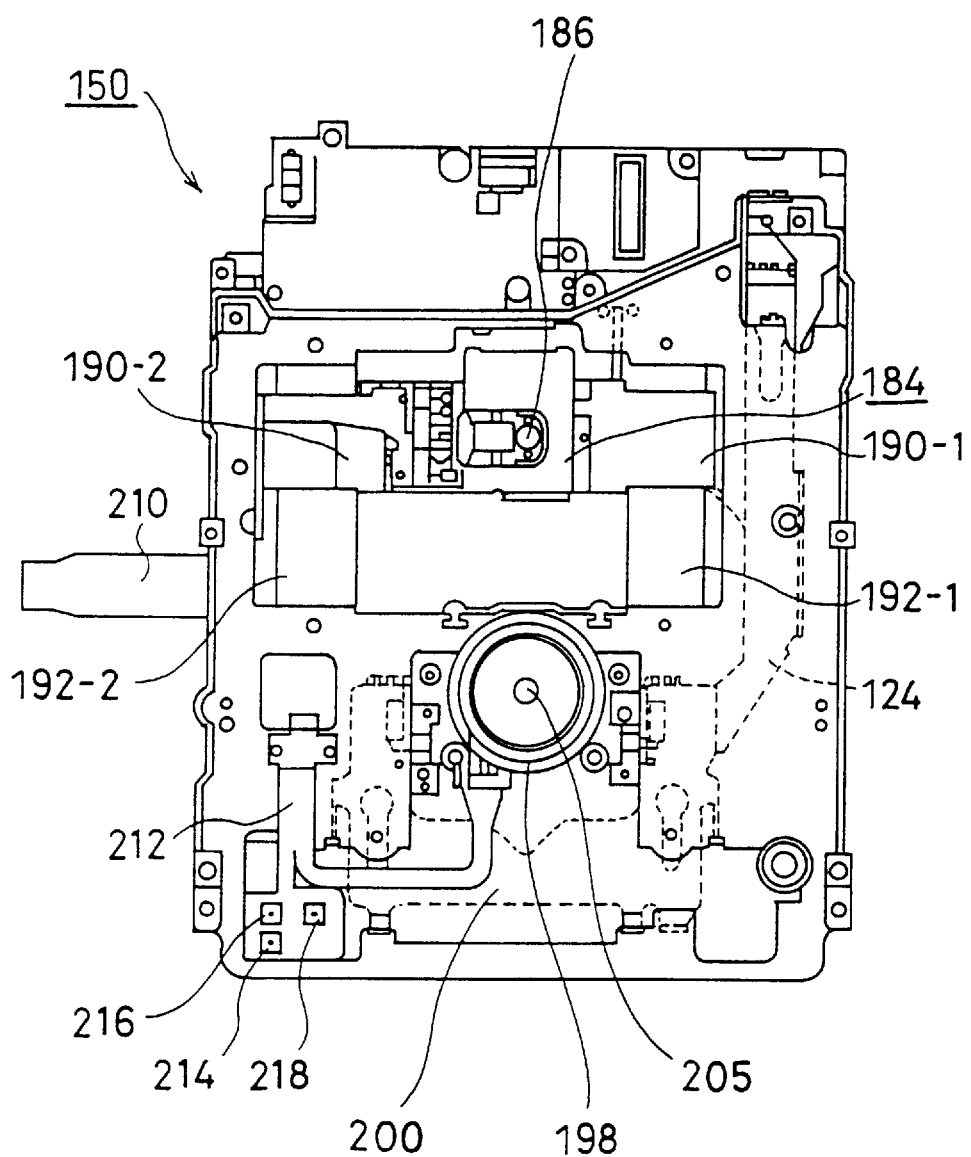
FIG. 4 is a plan view of an assembling state of FIG. 2.

FIG. 4 is a plan view of a state in which the printed circuit board 176 and cartridge holder 178 in FIG. 2 are removed with respect to the drive main body in FIG. 1. A spindle shaft 205 is provided at the center of the turntable 198 in the spindle unit. The hub of the medium of the MO cartridge inserted from the medium inserting slot serving as a lower side is coupled to the spindle shaft 205. In association with the insertion of the medium, when the medium hub is located to the spindle shaft 205, it is attracted by a magnet chucking, thereby coupling the hub with the spindle shaft 205. The lens carriage 184 allows the objective lens 186 upward. By supplying the currents to the coil portions 190-1 and 190-2 arranged on both sides, the lens carriage 184 is moved in the vertical direction for the magnetic yoke portions 192-1 and 192-2, namely, in the direction which traverses the tracks on the medium attached to the spindle shaft 205. An FPC (Flexible Printed Circuit) 212 is arranged on the medium inserting side serving as a front side of the turntable 198, thereby electrically connecting with the spindle motor built in the turntable 198. The FPC 212 is continued with an FPC 210 taken out to the side surface side, thereby connecting with the printed circuit board side. A write enable sensor 214, a write protection sensor 216, and a cartridge insertion sensor 218 are provided for the FPC 212 arranged on the entrance side. Pin switches or the like are used as those three sensors 214, 216, and 218. The write enable sensor 214 detects a write enable position of a switching knob of a write enable and a write protection which is provided for the MO cartridge medium. The write protection sensor 216 detects the write protecting position of the switching knob of the write enable and the write protection of the medium. The cartridge insertion sensor 218 detects the insertion of the MO cartridge medium for the drive main body 150, thereby allowing the drive to be activated. Specifically speaking, the turntable 198 is rotated by the spindle motor, thereby allowing the operation of the controller to be started.

Figure 3:
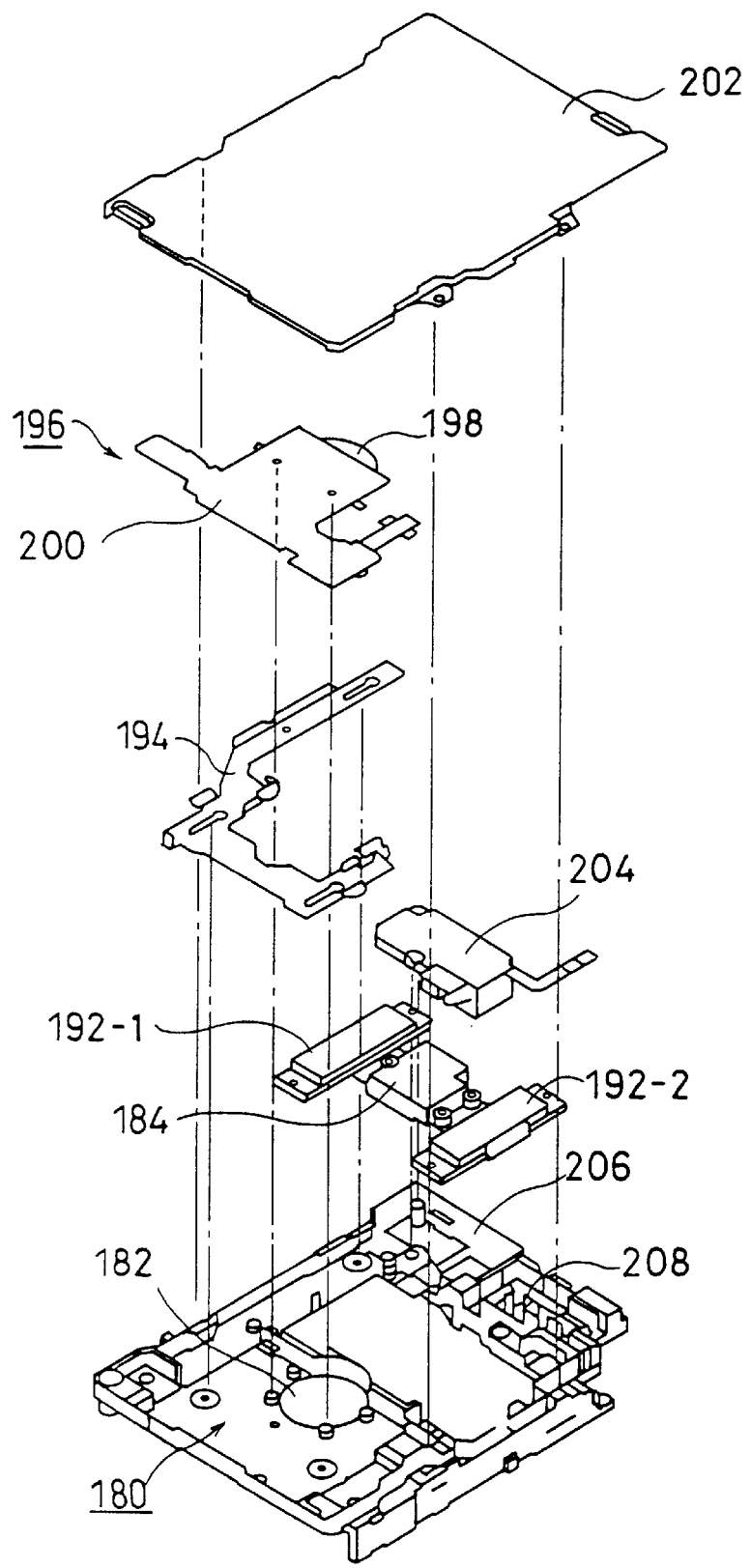
FIG. 3 is an assembly exploded diagram when component elements from a drive casing to a lower cover in FIG. 2 are seen from a bottom surface.
Figure 5:
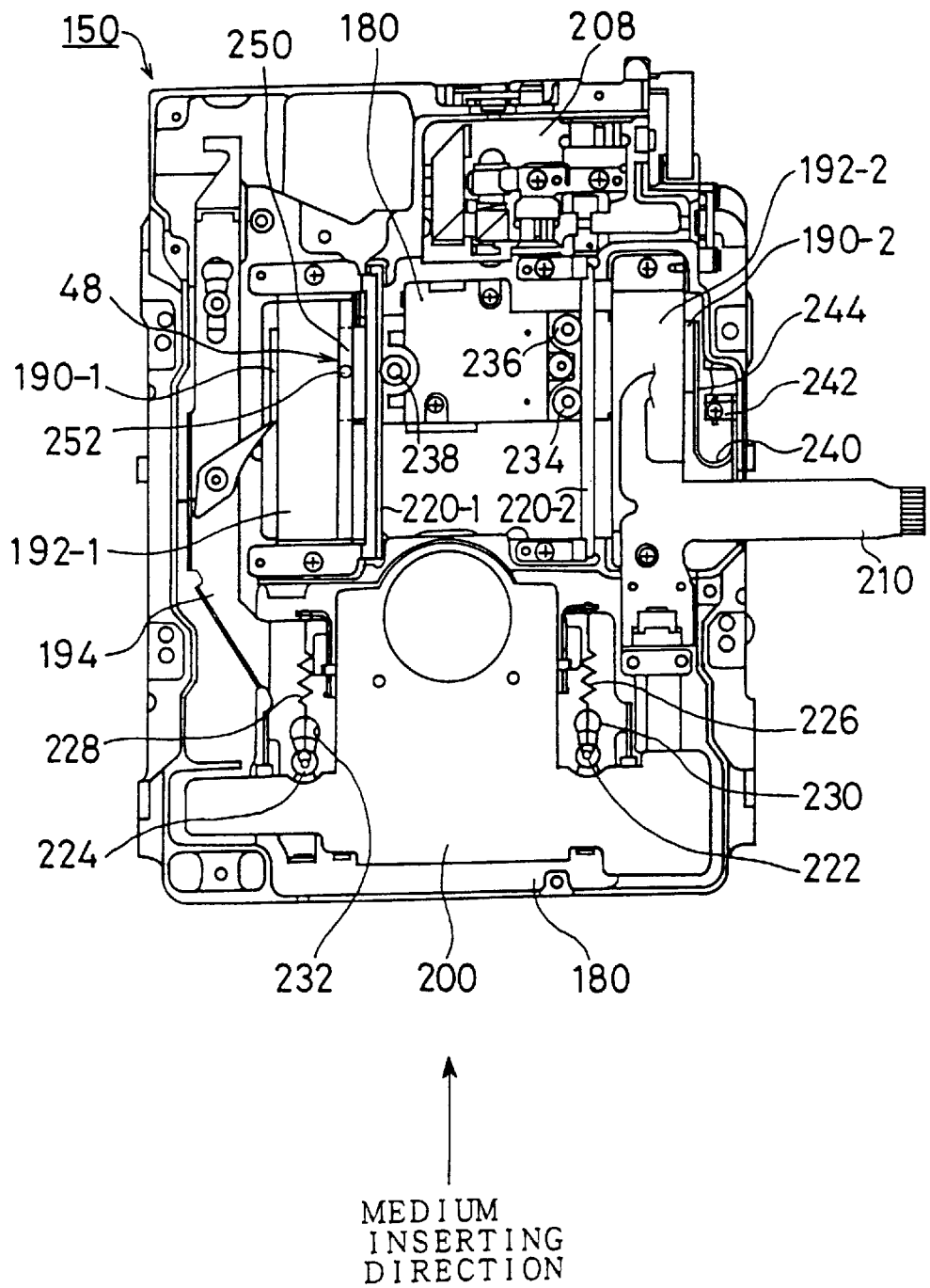
FIG. 5 is a bottom view of an assembling state of FIG. 2.

FIG. 5 is a diagram on the rear surface side of the drive main body 150 in FIG. 1 and shows a state in which the cover 202 in FIG. 3 is removed. The slide plate 194 is attached to pins 222 and 224 fixed to the drive base 180 side so as to be slidable in the medium inserting direction by guide grooves 230 and 232. Further, the slide plate 194 is urged to the medium inserting side by coil springs 226 and 228. Therefore, when the MO cartridge medium is inserted from the medium inserting slot side, the slide plate 194 is integratedly moved and is locked at a position where the lower sides of the guide grooves 230 and 232 come into contact with the pins 222 and 224. In this state, the medium hub is attached to the turntable. The fixed optical unit 208 is provided on the upper side in the diagram which faces the lens carriage 184. A detector for recording and reproduction of a laser diode, detectors for a tracking control and a focusing control, and further, an optical system of them are assembled in the fixed optical unit 208. The lens carriage 184 is provided for two guide rails 220-1 and 220-2 arranged on the drive base 180 side so as to be movable in the radial direction of the optical disk by roller bearings 234, 236, and 238. An FPC band 240 is attached between an edge surface of the coil portion 190-1 projected to the right side of the carriage 184 and the drive base 180 side. One end of the FPC band 240 is fixed to the drive base 180 side by a base fixing portion 242 and the other end is fixed to the carriage 184 side by a carriage fixing portion 244. A portion between them is dented in a U-shape. After the FPC band 240 was fixed by the base fixing portion 242, it is bent upward and reaches the FPC 210. However, a part of the FPC band 240 is illustrated with a part cut away in order to show the FPC band 240. Therefore, when the carriage 184 is moved along the guide rails 220-1 and 220-2 by the seek control, the U-shaped concave portion of the FPC band 240 is deformed due to the position of the carriage 184. A tension that is applied to the carriage 184 changes. Frictions of the bearings 234, 236, and 238 which roll on the guide rails 220-1 and 220-2 are also changed depending on the position of the carriage 184. Further, a carriage position sensor 48 for detecting the absolute position for the base side is provided for the carriage 184. A PSD is used as a carriage position sensor 48. In the embodiment, a sensing plate 250 of the PSD is fixed in the inner/outer direction along the magnetic yoke portion 192-1 of the VCM on the left side of the carriage 184. An LD 252 for irradiating the light to the sensing plate 250 is mounted on the carriage 184. When the light from the LD 252 is irradiated onto the sensing plate 250, a change in current amount depending on the length of plate for each of the inner side and the outer side is obtained from the light irradiated position, so that the PSD constructed by the sensing plate 250 and LD 252 can detect the absolute position of the carriage.

Figure 6:
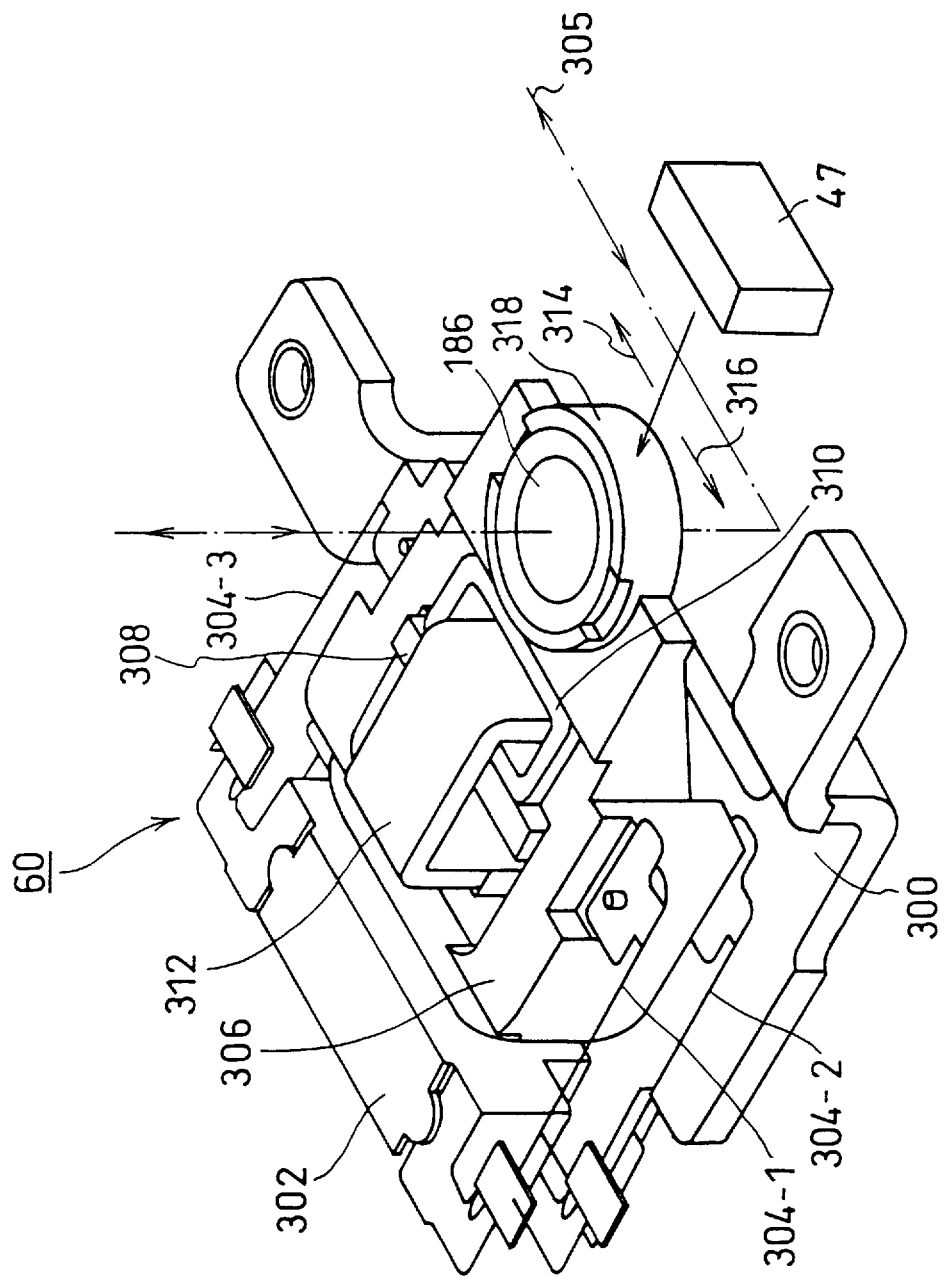
FIG. 6 is an explanatory diagram of a structure of a lens actuator which is used in the invention.

FIG. 6 shows a lens actuator 60 mounted on the lens carriage 184 in FIG. 2. The lens actuator 60 supports four wires 304-1 to 304-4 (304-4 is not shown) on the side surface of a holding portion 302 attached to a fixed base 300 in a cantilever state. A movable base 306 is supported at front edges of the wires 304-1 to 304-4 at four points. Therefore, the movable base 306 has a three-dimensional degree of freedom for the holding portion 302 serving on the fixed side due to bending states of the four wires 304-1 to 304-4. The objective lens 186 is mounted on the movable base 306. The objective lens 186 converges the light beam having a beam optical axis 305 from the fixed optical unit which was reflected by the lower portion, forms the light as an image onto the surface of the medium locating at the upper position, and returns the return light from the medium to the fixed optical unit by the same path. A tracking coil 308 and a focusing coil 310 are mounted on the movable base 306. The tracking coil 308 is located so as to wind a horizontal portion on the lower side of a yoke 312 provided for the fixed base 300 and moves the objective lens 186 through the movable base 306 in the outer direction shown by an arrow 314 or the inner direction shown by an arrow 316 by a current supply to the coil. The focusing coil 310 is located so as to wind a vertical portion of the yoke 312 and moves the objective lens 186 in the vertical direction through the movable base 306 by a current supply to the coil. A lens position sensor 47 for detecting a positional deviation of a lens optical axis of the objective lens 186 for the beam optical axis 305 from the fixed optical system is provided for the lens actuator 60. Namely, the lens position sensor 47 is arranged on the outside of a supporting ring 318 of the objective lens 186 so as to face the ring. The LD and a 2-split detector are arranged on the detecting surface side. When the optical axis of the objective lens 186 coincides with the optical axis 305 of the laser beam as shown in the diagram, the light from the LD of the lens position sensor 47 enters the peripheral surface of the supporting ring 318 from the normal line direction and is reflected by 100%. Since two photosensitive outputs of the 2-split detector are the same, a lens position signal (LPOS) is equal to zero because of a difference between the photosensitive outputs. When the objective lens 186 is moved and deviated from the optical axis 305, the photosensitive position on the 2-split detector is also changed in accordance with a deviation amount and the lens position signal of a level and a polarity according to the deviation amount is derived. In the coarse control in which the movement of the carriage by the VCM is mainly performed, the lens position signal (LPOS) which is derived from the lens position sensor 47 is used for a lens locking control to drive the lens actuator 60 so as to keep the lens positional deviation for the beam optical axis to zero. In the fine control in which the lens actuator 60 is mainly used, the signal LPOS is used in a lens locking control by a double servo to drive the carriage by the VCM so as to keep the positional deviation of the optical axis of the objective lens to zero.

[Circuit construction]

Figure 7A:
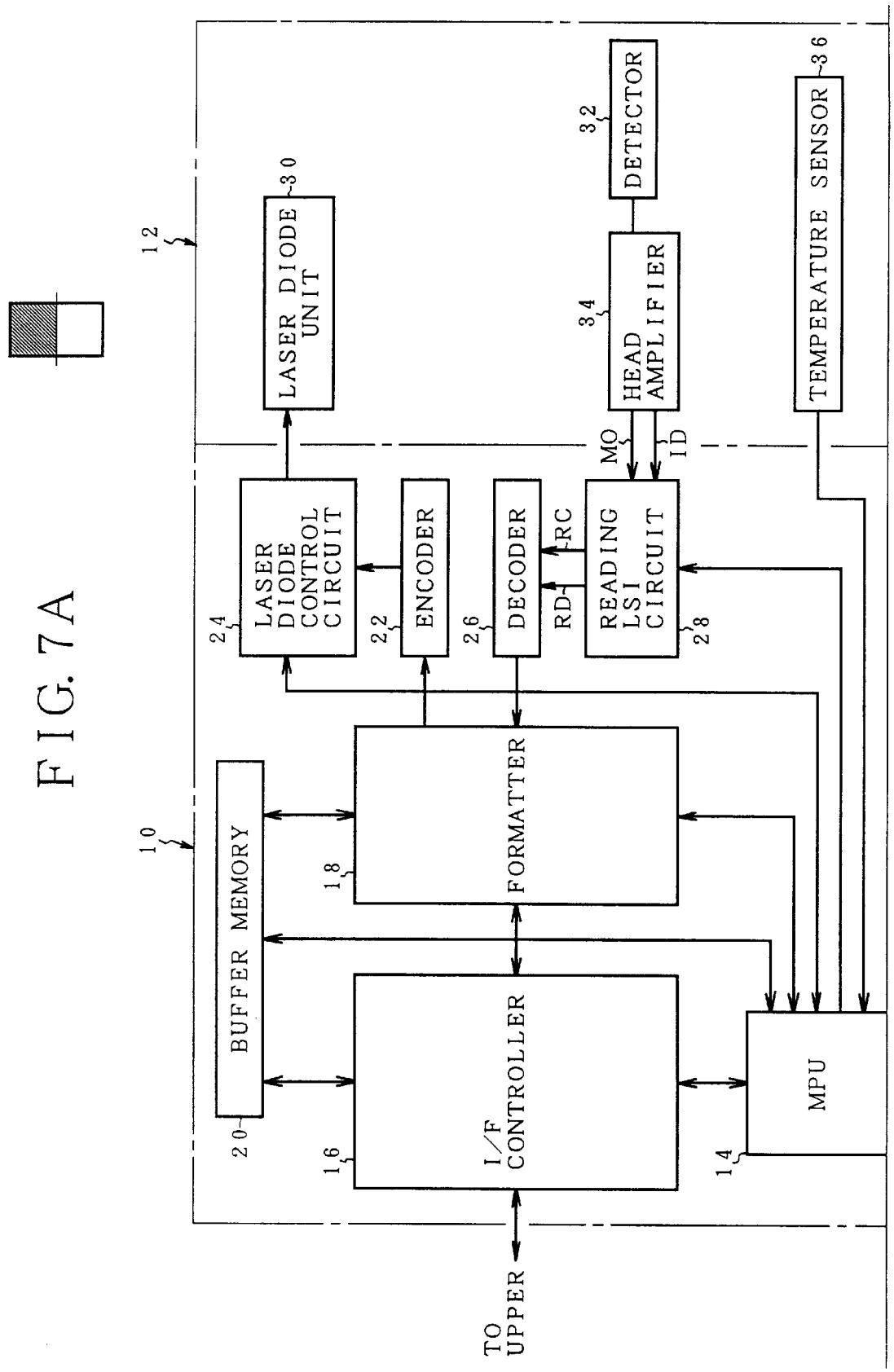
FIGS. 7A and 7B are circuit block diagrams of the invention.
Figure 7B:
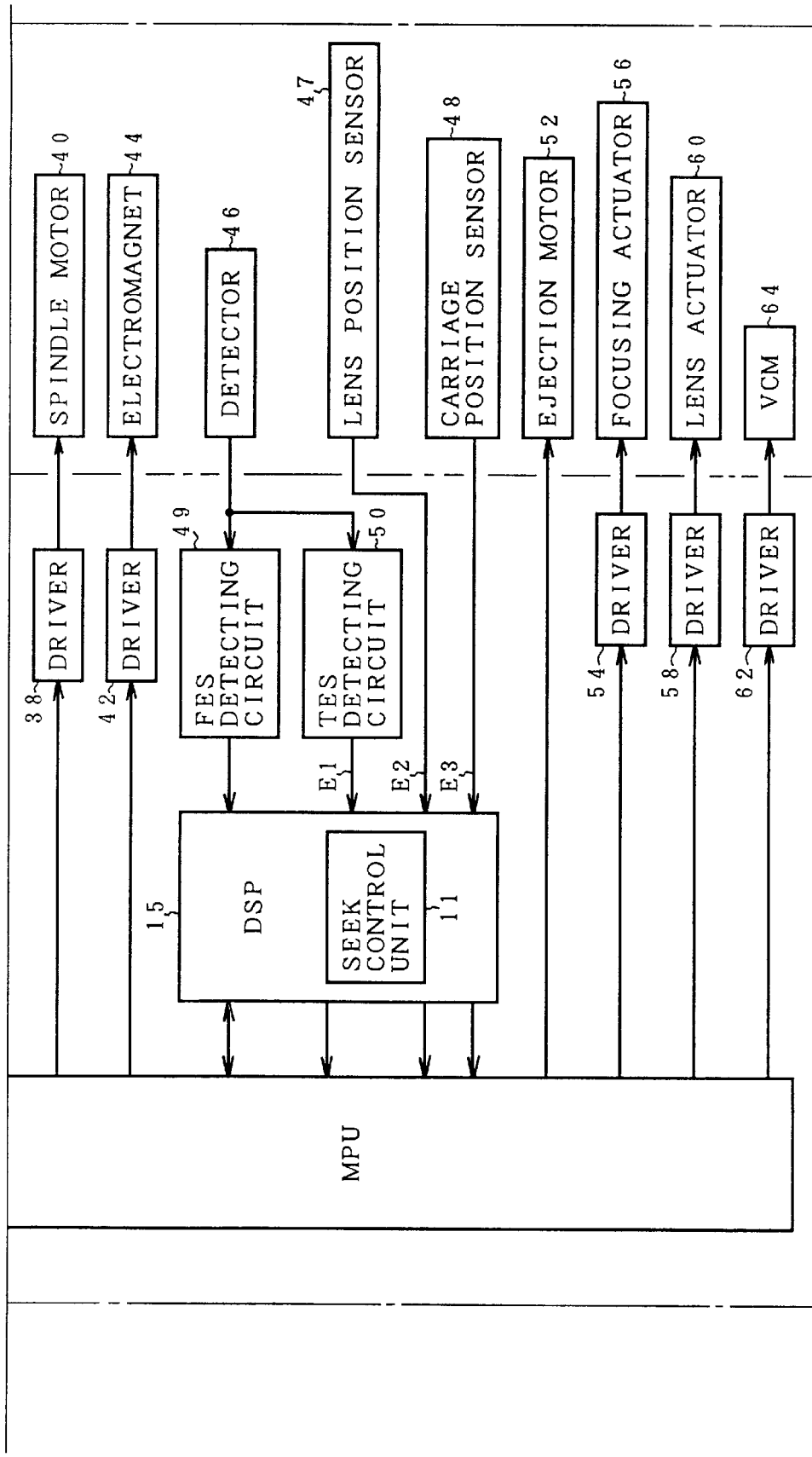

FIGS. 7A and 7B are circuit block diagrams on the side of a controller and an enclosure which are provided for the drive main body 150 in FIG. 1. An optical disk drive of the invention is constructed by a controller 10 and an enclosure 12. The controller 10 has: an MPU 14 for controlling the whole optical disk drive; an interface controller 16 for transmitting and receiving commands and data to/from an upper apparatus; a formatter 18 for executing processes necessary to write and read data to/from a medium; and a buffer memory 20. In the embodiment, the buffer memory 20 is commonly used for the MPU 14, interface controller 16, and formatter 18. An encoder 22 and a laser diode control circuit 24 are provided as a writing system for the formatter 18. A control output of the laser diode control circuit 24 is supplied to a laser diode unit 30 provided for the optical unit on the enclosure 12 side. The laser diode unit 30 integratedly has a laser diode and a photosensitive device for monitoring. As an MO cartridge medium for recording and reproducing by using the laser diode unit 30, in the embodiment, either a medium of 128 MB or a medium of 230 MB can be used. As a recording system in this case, a pit position recording (PPM) is used. As a recording format of the medium, a ZCAV (zone constant acceleration system) is used. In case of the medium of 128 MB, one zone is provided. In case of the medium of 230 MB, ten zones are provided. As a reading system for the formatter 18, a decoder 26 and a reading LSI circuit 28 are provided. A photosensitive signal of the return light of the beam from the laser diode unit 30 by a detector 32 provided for the enclosure 12 is supplied as an ID signal and an MO signal to the reading LSI circuit 28 through a head amplifier 34. Circuit functions of an AGC circuit, a filter, a sector mark detecting circuit, a synthesizer, a PLL, and the like are provided for the reading LSI circuit 28. A read clock and read data are formed by the ID signal and MO signal which were inputted and are outputted to the decoder 26. Since the zone CAV is used as a recording system of the medium by a spindle motor 40, a switching control of a clock frequency corresponding to a zone is executed for a synthesizer built in the reading LSI circuit 28 by the MPU 14. A detection signal of a temperature sensor 36 provided on the enclosure 12 side is supplied to the MPU 14. On the basis of a temperature in the apparatus detected by the temperature sensor 36, the MPU 14 controls each of the reading, writing, and erasing light emitting powers in the laser diode control circuit 24 to an optimum value. The MPU 14 controls the spindle motor 40 provided for the enclosure 12 by a driver 38. Since the zone CAV is used as a recording format of the MO cartridge medium, the spindle motor 40 is rotated at a constant speed of, for example, 2700 rpm. The MPU 14 controls the electromagnet 44 provided for the enclosure 12 side through a driver 42. The electromagnet 44 is arranged on the side opposite to the beam irradiating side of the MO cartridge medium loaded and applies an external magnetic field to the medium upon recording and erasing.

A DSP 15 has servo functions of a tracking control and a focusing control of the objective lens installed in the lens carriage. For this purpose, a 2-split detector 46 for receiving the beam return light from the medium is provided for the optical unit on the enclosure 12 side. An FES detecting circuit (focusing error signal detecting circuit) 49 forms a focusing error signal from a photosensitive output of the 2-split detector 46 and supplies to the DSP 15. A TES detecting circuit (tracking error signal detecting circuit) 50 forms a tracking error signal E1 from the photosensitive output of the 2-split detector 46 and supplies to the DSP 15. Further, a lens position signal E2 from the lens position sensor 47 and a carriage position signal E3 indicative of the absolute position from the carriage position sensor 48 are supplied to the DSP 15. The DSP 15 executes various operations for a focusing servo and a tracking servo and outputs operation results to the MPU 14. On the basis of the operation results of the DSP 15, the MPU 14 drives a focusing actuator 56 through a driver 54, drives the lens actuator 60 through a driver 58, and further, drives a VCM 64 of a lens carriage through a driver 62. Moreover, the MPU 14 can also drive an ejection motor 52 in accordance with an ejection switch. A seek by a seek control unit 11 which is realized as a function of the DSP 15 is divided into a long seek in the case where the number of remaining tracks to a target track is large and a short seek in the case where the number of moving tracks to the target track is small. The short seek is a low speed seek control in which the driving of the lens actuator 60 is mainly performed and is divided into a fine control to control the speed of the lens actuator 60 and a deceleration control to pull in the light beam to the target track. During the fine control, the double servo is turned on and a lens locking control for driving the VCM 64 for a lens lock to hold the optical axial deviation of the objective lens to zero is executed. In the long seek, a coarse control serving as a high speed seek control to control the speed of the VCM 64 is first executed and, when the number of remaining tracks to the target track decreases to a specified value, the control mode is switched to a fine control to control the speed of the lens actuator 60, and the deceleration control is finally performed. During the coarse control to control the speed of the VCM 64, the lens position servo is turned on and a lens locking control to drive the lens actuator 60 for a lens lock to hold the optical axial deviation of the objective lens to zero is executed. The speed control in each of the fine control in which the lens actuator 60 is mainly driven in the short seek and the coarse control in which the VCM 64 is mainly driven in the long seek is executed in a manner such that a target speed is set in accordance with the number of remaining tracks to the target track and the actual measured beam speed traces the target speed. The speed control has a speed profile of an acceleration period of time, a constant speed period of time, and a deceleration period of time. In the deceleration control just before the target track, for example, a preset deceleration current is supplied to the lens actuator 60 at a track of 0.5 track before the target track. It is also possible to construct in a manner such that a beam speed is detected from the tracking error signal at a track of 1 to 2 tracks before the target track and a value of the deceleration current which is supplied at a track of 0.5 track before the target track is calculated in a real-time manner in order to set the beam speed to zero and the optimum deceleration control is executed. Further, in an adjusting step after the optical disk drive was manufactured, the seek control unit 11 of the DSP 15 executes a bias current measuring process such that the carriage 184 is moved and held at a plurality of predetermined measurement positions for the frictions between the guide rails 220-1 and 220-2 and the roller bearings 234, 236, and 238 in association with the movement of the carriage 184 shown in FIG. 5 and the tension of the FPC band 240 and a current to be supplied to the VCM 64 serving as a carriage actuator for the purpose of the position holding is measured as a bias current and stored into a measurement position table as a storing unit. The bias current measuring process is divided into measuring modes 1 to 4 in FIG. 8 in dependence on a difference between a designating method of the measurement position and a method of a position control at the measurement position. In the measuring modes 1 and 2, the measurement position is designated by a track number of the medium. In the measuring modes 3 and 4, on the other hand, the measurement position is designated on the basis of a sensor detection value of the carriage position sensor 48 for detecting the absolute position of the carriage. A difference between the measuring modes 1 and 2 is based on the control of the position holding of the carriage at the measurement position. Namely, in the measuring mode 1, an on-track control by the tracking servo based on the tracking error signal is executed and, at the same time, a double servo to hold the lens position to a zero position is turned on, and a double servo current to be supplied to the VCM 64 at this time is measured. On the other hand, in the measuring mode 2, the tracking servo is turned off at the measurement position, what is called a position locking servo for position controlling the VCM 64 so as to keep the detecting position of the carriage position sensor 48 is turned on at the measurement position, and a position lock current to be supplied to the VCM 64 in this instance is measured. A difference between the measuring modes 3 and 4 is also the same as that between the measuring modes 1 and 2. In the measuring mode 3, each of the tracking servo and the double servo is turned on at the measurement position and a double servo current is measured. In the measuring mode 4, a position locking servo due to the carriage position sensor 48 is turned on at the measurement position and a position lock current is measured. The measuring modes 1 to 4 will be further described in detail in a measuring process hereinlater.

FIG. 9 shows a control mode of an offset correction which is executed during the seeking of the optical disk drive after a position measuring table of the bias current to hold the position of the carriage was formed for a mechanical offset of the VCM 64 by the measuring process in the adjusting step. The control mode is divided into control modes A to D due to a difference between the measuring modes and operating processes of table read-out values. First, the control modes A and B use a measurement position table formed by the measuring mode 1 or 2 in FIG. 8 and are common with respect to a point that a track number Tn is used as a table reference value. The control modes A and B are different with respect to the operating process of the bias current. In the control mode A, when the table is referred by the present track number, a bias current of the present track is calculated by a linear interpolation of bias current values of the measurement track numbers locating on both sides of the present track number. On the other hand, in the control mode B, there is executed what is called an adjacent approximation to select the bias current value of the measurement track number (between the adjacent measurement track numbers) that is closer to the present track number. The control modes C and D use the measurement position table formed by the measuring mode 3 or 4 in FIG. 8 and are common with respect to a point that a position detection value Pn of the carriage position sensor 48 is used as a table reference value. The control modes C and D are different with respect to the operating process of the bias current. In the control mode C, when the table is referred by the present carriage position, the bias current at the present carriage position is calculated by a linear interpolation of the bias current values at the measuring carriage positions located on both sides of the present carriage position. On the other hand, in the control mode D, there is executed an adjacent approximation for selecting the bias current value at the measuring carriage position (between the adjacent measuring carriage positions) that is closer to the present carriage position.

[Measuring modes 1 and 2 and control modes A and B]

Figure 10B:
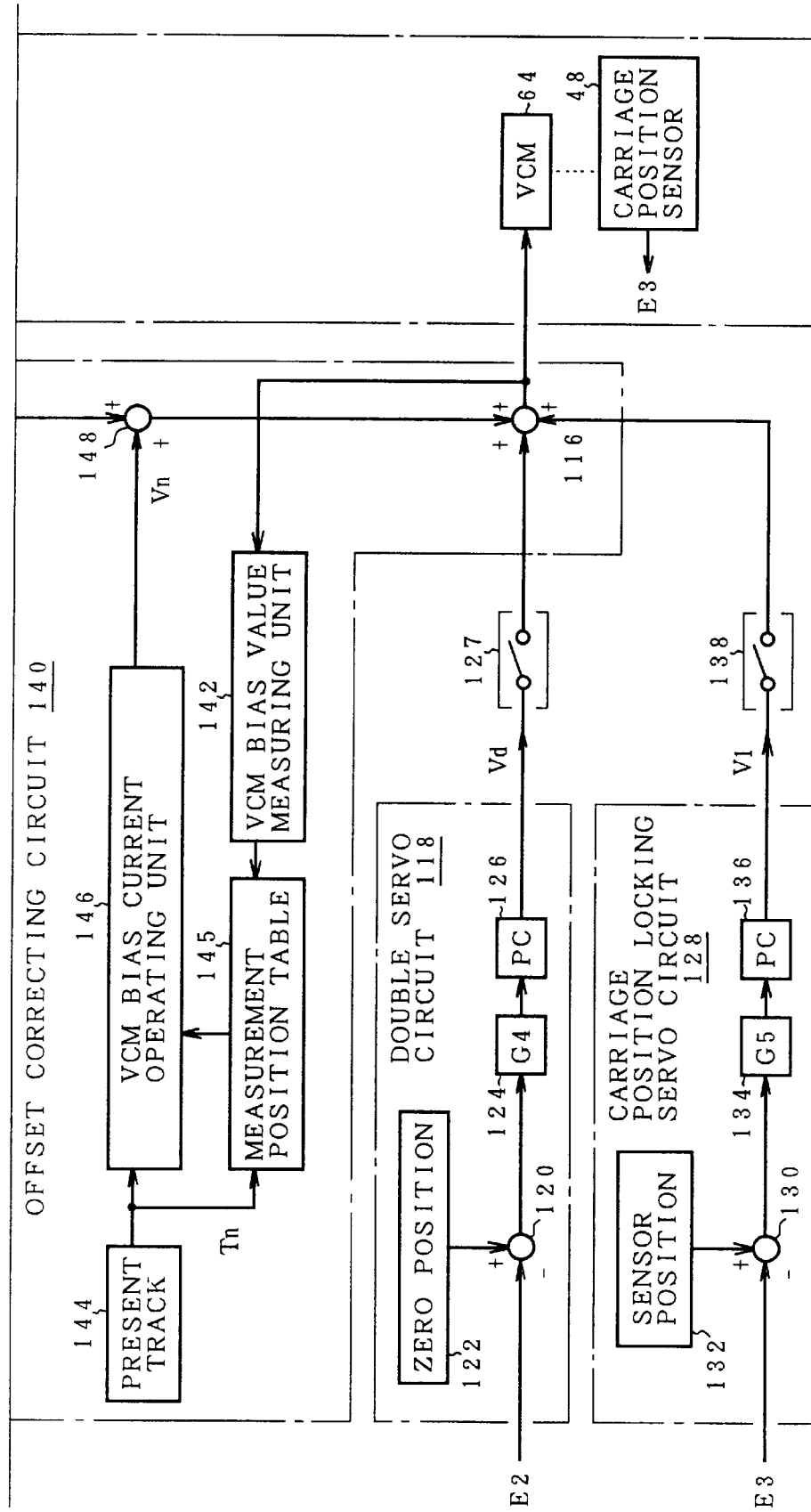

FIGS. 10A and 10B are functional block diagrams of the seek control unit 11 by the DSP 15 in FIG. 7B and is characterized in that after the measurement position table was formed on the basis of the measuring mode 1 or 2 in FIG. 8, a seek current is corrected by the control mode A or B in FIG. 9. The lens actuator 60 which is necessary for a seek control, the detector 46 for detecting the tracking error signal E1, and the lens position sensor 47 for detecting the position of the objective lens are shown on the enclosure 12 side. The tracking error signal E1 and lens position signal E2 are outputted. The VCM 64 serving as a carriage actuator and the carriage position sensor 48 which is provided on the base side and detects the absolute position of the carriage are shown in the enclosure 12. The carriage position signal E3 is generated from the carriage position sensor 48. The seek control unit 11 of the DSP 15 in FIG. 7 is constructed by a lens position servo circuit 66, a tracking servo circuit 78, a speed control circuit 90, and a double servo circuit 118. A carriage position locking servo circuit 128 is provided for a position control to the measurement position and a position locking control using the carriage position sensor 48. Further, there is provided an offset correcting circuit 140 for measuring a bias current which is supplied to the VCM 64 at the designated measurement position, forming a table, obtaining a bias current by referring to the table during the seeking after completion of the measurement, and correcting a seek current. In the lens position servo circuit 66, a zero position is set into an addition point 68 by a register 70, a position deviation between a target position and the position shown by the lens position signal E2 from the lens position sensor 47 is obtained while setting the zero position of the register 70 to the target position, the position deviation is multiplied with a predetermined gain G2 by a gain setting device 72, an advance phase compensation is performed to a phase of a high frequency in a servo band by a phase compensator 74, and after that, the lens actuator 60 is driven through a servo switch 76. The servo switch 76 is turned on in the coarse control for controlling the speed of the VCM 64 by the long seek in which the number of remaining tracks to the target track exceeds, for example, 50 tracks. For the movement of the carriage by the VCM 64, a lens lock for setting an optical axial deviation of the objective lens by the lens actuator 60 mounted on the carriage to zero is executed. In the tracking servo circuit 78, the zero position of the tracking error signal set in a register 82 is inputted to an addition point 80, a deviation from the tracking error signal E1 obtained from the photosensitive output of the detector 46 is obtained by the addition point 80 and is multiplied with a predetermined gain G1 by a gain setting device 84. After that, a phase compensation is performed by a phase compensator 86 and the lens actuator 60 is driven through a servo switch 88. The servo switch 88 is OFF during the seeking operation. When the light beam reaches the target track due to a completion of the seeking, the servo switch 88 is turned on, thereby executing an on-track control for allowing the light beam to trace the track. The speed control circuit 90 has a target speed setting unit 100 and a speed operating unit 102. The number of remaining tracks to the target track which is given by a difference between the target track number set in a register 98 and the present track number which is formed by a track zero-cross point circuit 92 and a track counter 94 is calculated by a track difference operating unit 96. A target speed which has been predetermined in correspondence to the track difference is outputted to an addition point 106 by the target speed setting unit 100. The speed operating unit 102 is activated at a zero-cross point of the tracking error signal E1 which is detected by a count value of the track counter 94 and the track zero-cross point circuit 92, receives a count result of a timer 104 for counting a time interval between the zero-cross points, and calculates a light beam speed as a reciprocal number of the zero-cross point time interval counted by the timer 104 and supplies to the addition point 106. The addition point 106 takes out a speed deviation between the target speed and the present beam speed. The speed deviation is multiplied with a predetermined gain G3 by a gain setting device 108. A phase compensator 110 executes a phase compensation to an output signal of the gain setting device 108 and generates a speed control signal. In the first coarse control in the long seek, since a servo switch 112 is OFF and a servo switch 114 is ON, the speed control signal from the speed control circuit 90 is supplied as a seek current Vs to the VCM 64 serving as a carriage actuator through an addition point 116, thereby executing a speed control of the VCM 64. When the number of remaining tracks to the target track reaches a specified number of tracks, for example, 50 tracks during the coarse control in the long seek, the servo switch 114 is turned off and servo switch 112 is turned on. The speed control signal from the speed control circuit 90 is supplied to the lens actuator 60, thereby executing the fine control to control the speed of the light beam by the lens actuator. In the short seek in which the number of remaining tracks to the target track is less than, for example, 50 tracks, the servo switch 112 is turned on and the servo switch 114 is turned off from the beginning, so that the fine control by the speed control of the lens actuator 60 is started. In the double servo circuit 118, the zero position of the lens position sensor 47 is set as a target position into a register 122. A position deviation from the lens position signal E2 from the lens position sensor 47 is extracted by an addition point 120. The position deviation is multiplied with a predetermined gain G4 by a gain setting device 124. After that, a phase compensator 126 executes a phase compensation to an output signal of the gain setting device 124. A phase compensated signal of the phase compensator 126 is supplied to the VCM 64 as a double servo current Vd through the servo switch 114 and addition point 116. The servo switch 114 is turned on in the fine control during the seeking. In this instance, the servo switch 114 is turned off, the servo switch 112 is turned on, and the speed of the lens actuator 60 is controlled. In parallel with the speed control of the lens actuator 60, a double servo for holding lens position at the zero position by the VCM 64 and locking the lens is executed. The carriage position locking servo circuit 128 executes a position servo using the carriage position sensor 48 to detect the absolute position of the carriage. For this purpose, the value of the sensor position serving as a target position is set into a register 132. A position deviation from the carriage position signal E3 from the carriage position sensor 48 is extracted at an addition point 130 and is multiplied with a predetermined gain G5 by a gain setting device 134. After that, a phase compensator 136 executes a phase compensation to an output signal of the gain setting device 134 and supplies an output signal as a carriage position control signal V1 to the VCM 64 through a servo switch 138 and the addition point 116. In the position control of the carriage by the carriage position locking servo circuit 128, the servo switch 114 for a speed control and a servo switch 127 for a double servo are turned off and only the servo switch 138 is turned on. Therefore, a position locking control for moving the carriage to the sensor position set in a register 132 by the position control of the VCM 64 and holding it at such a position is executed.

In the offset correcting circuit 140, there are provided: a bias current measuring unit 142; a register 144 for setting a track number; a measurement position table 145; a bias current operating unit 146; an addition point 148 for adding a bias current Vn to the seek current Vs from the speed control circuit 90; and the addition point 116 for adding the bias current Vn to the double servo current Vd from the double servo circuit 118. In the embodiment, the bias current measuring unit 142 executes a bias current measuring process in accordance with the designation in either one of the measuring modes 1 and 2 in FIG. 8. A measurement result by the bias current measuring unit 142 is stored into the measurement position table 145. As a measurement position table 145, a non-volatile memory such as a flash ROM or the like which can hold memory contents even if a power source of the optical disk drive is shut off is used. A plurality of measurement track numbers are prepared as indices in the measurement position table 145. When the measuring process is executed, the measurement track numbers in the table are sequentially read out by the bias current measuring unit 142 and set as target track numbers into the register 98 of the speed control circuit 90, thereby allowing the seek control to the measurement position to be performed. In a seek completion state, the double servo current Vd from the double servo circuit 118 to the VCM 64 is measured and stored in a holding state at the measurement track position according to each measuring mode. When the seek control is activated in a using state of the optical disk drive after the measurement position table 145 was formed in the adjusting step, the bias current operating unit 146 sets the track number at the present position that is obtained during the seeking, refers to the measurement position table 145 by the set present track number, reads out the bias current values of the two measurement track numbers locating on both sides from the measurement position table 145, and calculates the bias current Vn. In case of the control mode A in FIG. 9, the bias current operating unit 146 obtains the bias current Vn of the present track Tn by a linear interpolation based on the bias currents of the two measurement track numbers which were read out from the measurement position table 145. In case of the control mode B in FIG. 9, the bias current value of the measurement track number which is closer to the present track number is selected and is directly set to the bias current Vn of the present track number. In the coarse control, the bias current Vn at the present track number obtained by the bias current operating unit is added to the seek current Vs from the speed control circuit 90 at the addition point 148. On the other hand, in case of the fine control, the bias current Vn is added to the double servo current Vd from the double servo circuit 118 at the addition point 116. Those addition currents are supplied to the VCM 64, respectively. Therefore, the addition points 148 and 116 function as a correcting unit of a mechanical offset by the bias current.

Figure 11:
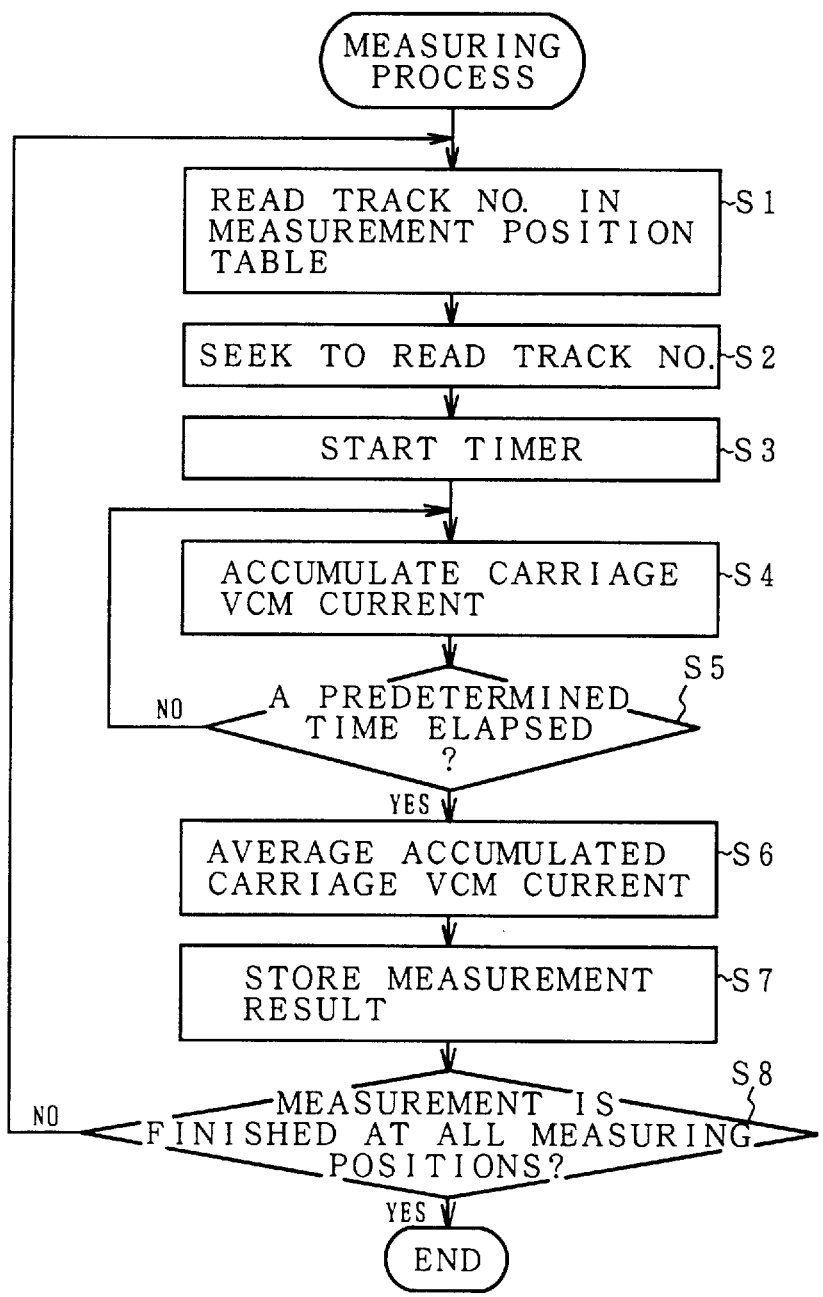
FIG. 11 is a flowchart for a measuring process in the measuring mode 1 of the invention.

FIG. 11 is a flowchart for a measuring process in the case where the measuring mode 1 in FIG. 8 is set into the bias current measuring unit 142 provided for the offset correcting circuit 140 in FIGS. 10A and 10B. First in step S1, the head track number indicative of the measurement track serving as an index of the measurement position table 145 is read. For example, as shown in FIG. 12, the measurement position table 145 has a storing area of the track number Tn and VCM bias current value Vn. In an initial state, track numbers T1 to T12 indicative of predetermined measurement positions have been stored in the table 145. When the track number is read out from the measurement position table 145 in step S1, the track number is set into the target track register 98 in the speed control circuit 90 and a seeking operation to the measurement track number is performed. In the seeking to the measurement track number, now assuming that the number of tracks of the optical disk medium is equal to, for example, 2000 tracks, since 2000 tracks are equivalently divided into ten groups by track numbers T1 to T12 in FIG. 12, the interval between the measurement track numbers is equal to 200 tracks. Thus, all of the seeking modes to the measurement tracks are set to the long seek. In case of the long seek, the servo switch 112 is turned off and the servo switch 114 is turned on. The coarse control by the speed control of the VCM 64 in which the seek current Vs is supplied to the VCM 64 is first executed. When the number of remaining tracks is equal to the specified number of tracks, for example, 50 tracks, the servo switch 114 is turned off and, at the same time, the servo switch 112 is turned on.

The control mode is switched to the fine control for performing the speed control by supplying the seek current Vs to the lens actuator 60. The control mode is switched to the deceleration control at a timing just before the target measurement track number, thereby completing the seeking. In case of the coarse control, obviously, the servo switch 76 is turned on and a lens lock is applied by the position control of the lens actuator 60 by the lens position servo circuit 66. When the control mode is switched to the fine control, the servo switch 124 is turned on and a lens lock is applied by the double servo of the VCM 64 by the double servo circuit 118. After completion of the seeking to the track number serving as the measurement position which was read, the servo switch 76 is turned off and the lens lock by the lens position servo 66 is released. At the same time, the servo switch 112 is also turned off and the speed control is released. Further, the servo switch 88 is turned on and the on-track control by the tracking servo circuit 78 is executed. Even in the on-track control, the servo switch 124 maintains the ON state. By the double servo control of the VCM 64 by the double servo circuit 118, a double servo for making the motion of the carriage such as to always set the optical axial deviation of the objective lens to zero for the trace of the light beam to the track by the lens actuator 60 is executed. When the seeking to the measurement track number is completed in step S2 and the light beam enters the on-track state as mentioned above, a timer is started in step S3. In step S4, the current supplied to the VCM 64, namely, the double servo current Vd from the double servo circuit 118 is sampled by a D/A converter built in the DSP 15 and sampled values are accumulated. The accumulation by the sampling of the current for the VCM 64 of the carriage is repeated until a predetermined time elapses by the activated timer in step S5. When the elapse of the predetermined time is discriminated in step S5, step S6 follows. A bias current is obtained by averaging the carriage VCM current accumulated in dependence on the number of sampling times. In step S7, the measurement result is stored into the measurement position table 145 as a VCM bias current value V1, for example, like a track number T1 in FIG. 12. In step S8, a check is made to see if the measurement at all of the measurement positions has been finished. When the measurement is not yet finished, the next track number T2 is read out and the processes from step S1 are repeated. After completion of the processes at all of the measurement positions up to the track number T12, a series of measuring processes are finished.

Figure 13:
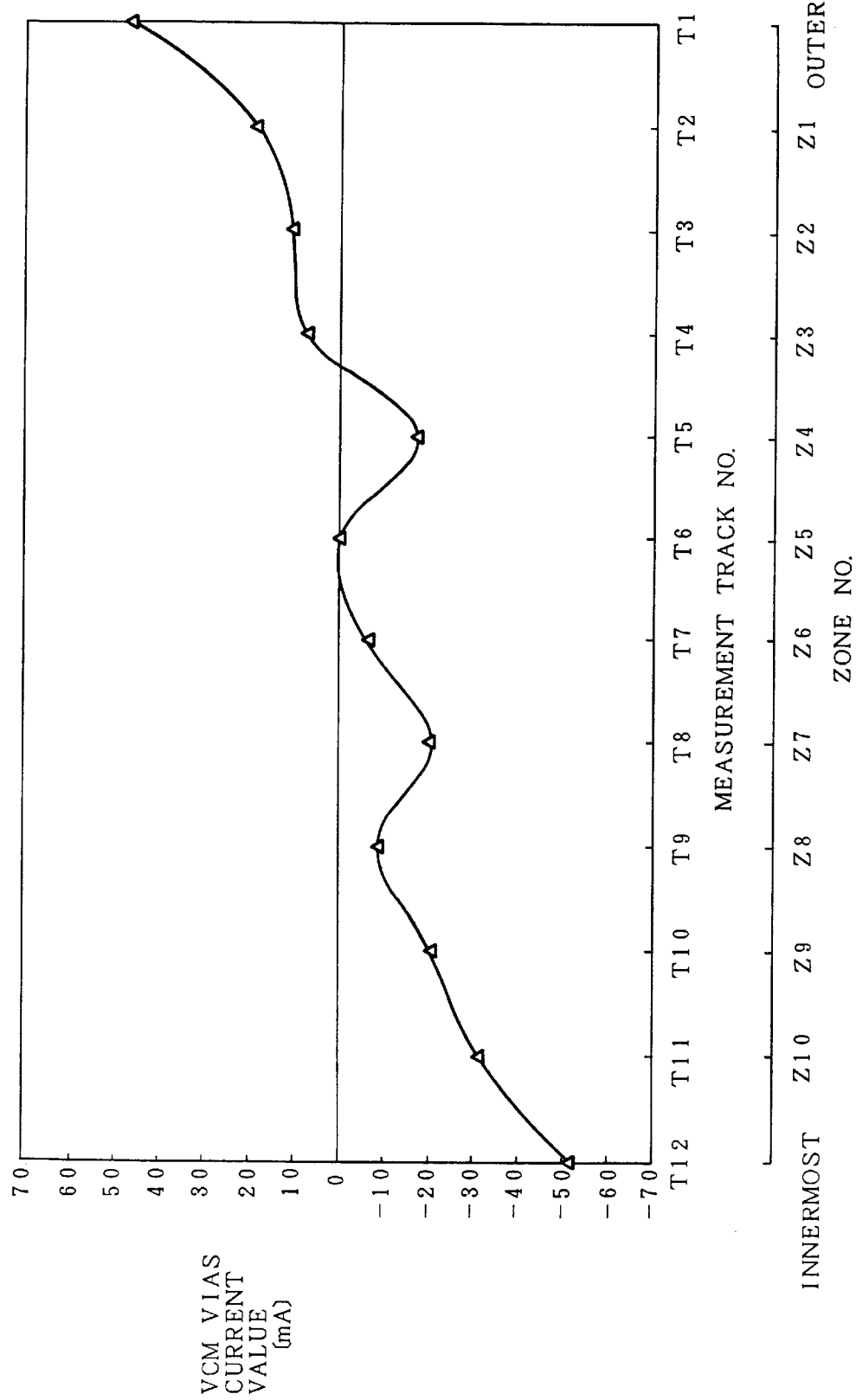
FIG. 13 is an explanatory diagram of an actual measurement result of a bias current for a track number obtained by the measuring process in FIG. 11.

FIG. 13 shows actual measurement values of the VCM bias current values derived by the measuring processes in FIG. 11. In the actual measurement values, the VCM bias current values are averaged and plotted every measurement track numbers T1 to T12 in a range from the outermost track to the innermost track shown on an axis of abscissa. The measurement track numbers T1 to T12 correspond to the zone CAV format in which the medium is divided into zones Z1 to Z10 as a recording format of the optical disk medium in the embodiment. Each zone center is set to the measurement track number. As will be obviously understood from the actual measurement result, the VCM bias current value to hold the position of the carriage at the measurement track T6 where the carriage is located at the center is equal to zero. It will be understood that no mechanical offset is applied at this position. On the other hand, when the carriage is moved to the inner side, the VCM bias current value to hold the carriage at each measurement track position increases to the minus side and it will be understood that as the carriage approaches the innermost side, the mechanical offset which is applied to the carriage increases. Even when the carriage is moved to the outer side from the track number T6, the VCM bias current value increases in the plus direction in association with the movement of the carriage on the contrary to the inner side and it will be understood that the mechanical offset in the direction opposite to that on the inner side increases.

Figure 14:
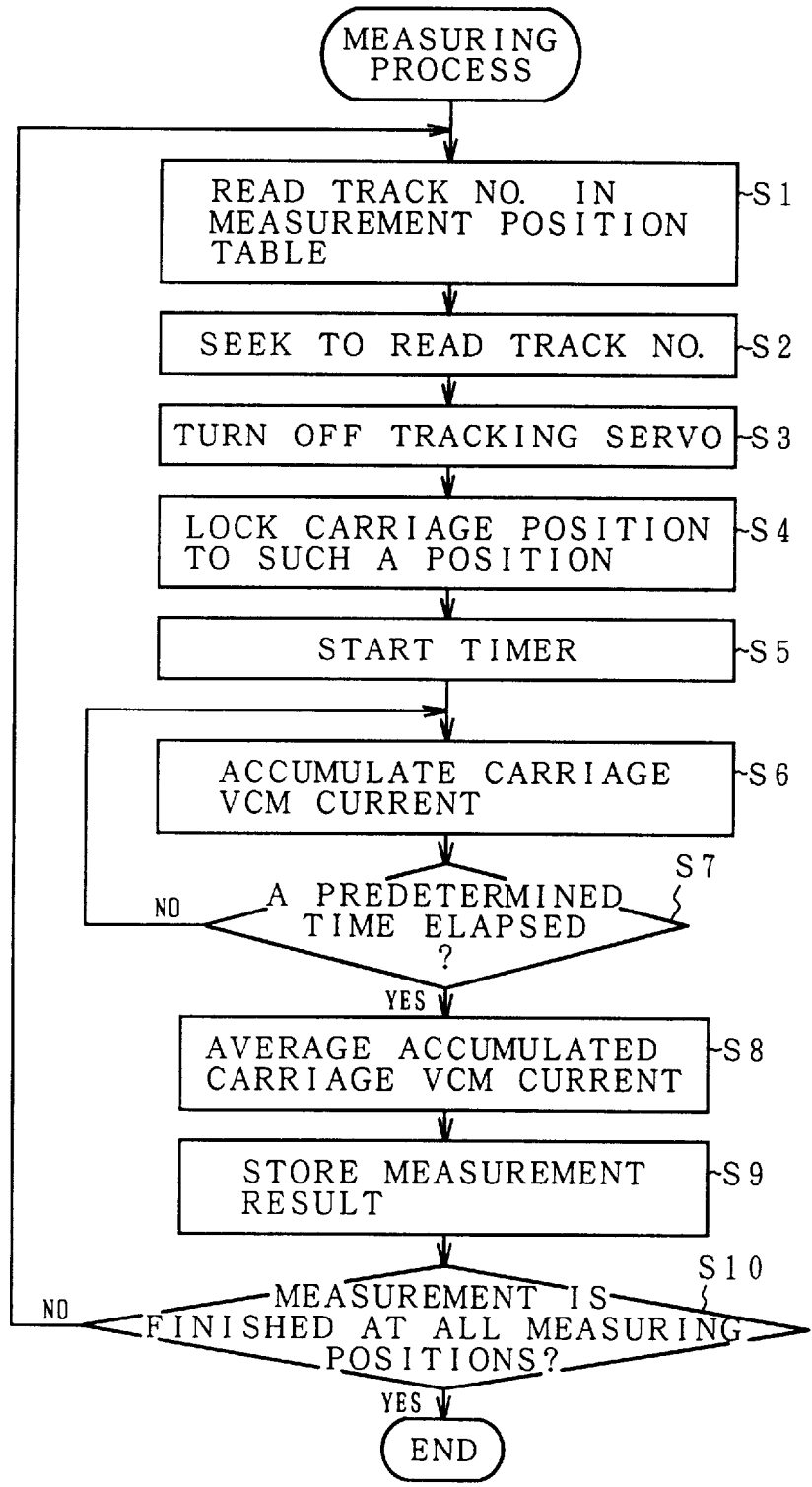
FIG. 14 is a flowchart for a measuring process in the measuring mode 2 of the invention.

FIG. 14 is a flowchart for a measuring process in the case where the measuring mode 2 is designated for the bias current measuring unit 142 in FIGS. 10A and 10B. First in step S1, the first track number is read out from the measurement position table 145. In step S2, the light beam is sought to the track number which was read. In the measuring mode 2, in step S3, after completion of the seeking, the servo switch 88 in FIG. 10 is turned off and the tracking servo of the lens actuator 60 by the tracking servo circuit 78 is turned off. In place of it, the servo switch 138 is turned on in step S4. After completion of the seeking, the measurement position of the carriage detected by the carriage position sensor 48 is set as a target position into the register 132 of the carriage position locking servo circuit 128. A position locking servo for setting the carriage position at the time of the completion of the seeking to the target position is executed. The servo switch 127 is obviously OFF and the double servo is released. In the position locking state of the carriage by the carriage position locking servo circuit 128, step S5 follows and the timer is started. In step S6, the carriage VCM current is sampled and sampled values are accumulated. Namely, the position locking current which is supplied from the carriage position locking servo circuit 128 to the VCM 64 is sampled and sampled values are accumulated.

When a predetermined time elapses from the start of the timer in step S7, step S8 follows and the accumulated carriage VCM current is divided by the number of sampling times, thereby averaging. The measurement result is stored into the measurement position table 145 in step S9. The above processes are repeated until the measurements at all of the measurement positions are finished in step S10.

Figure 15B:
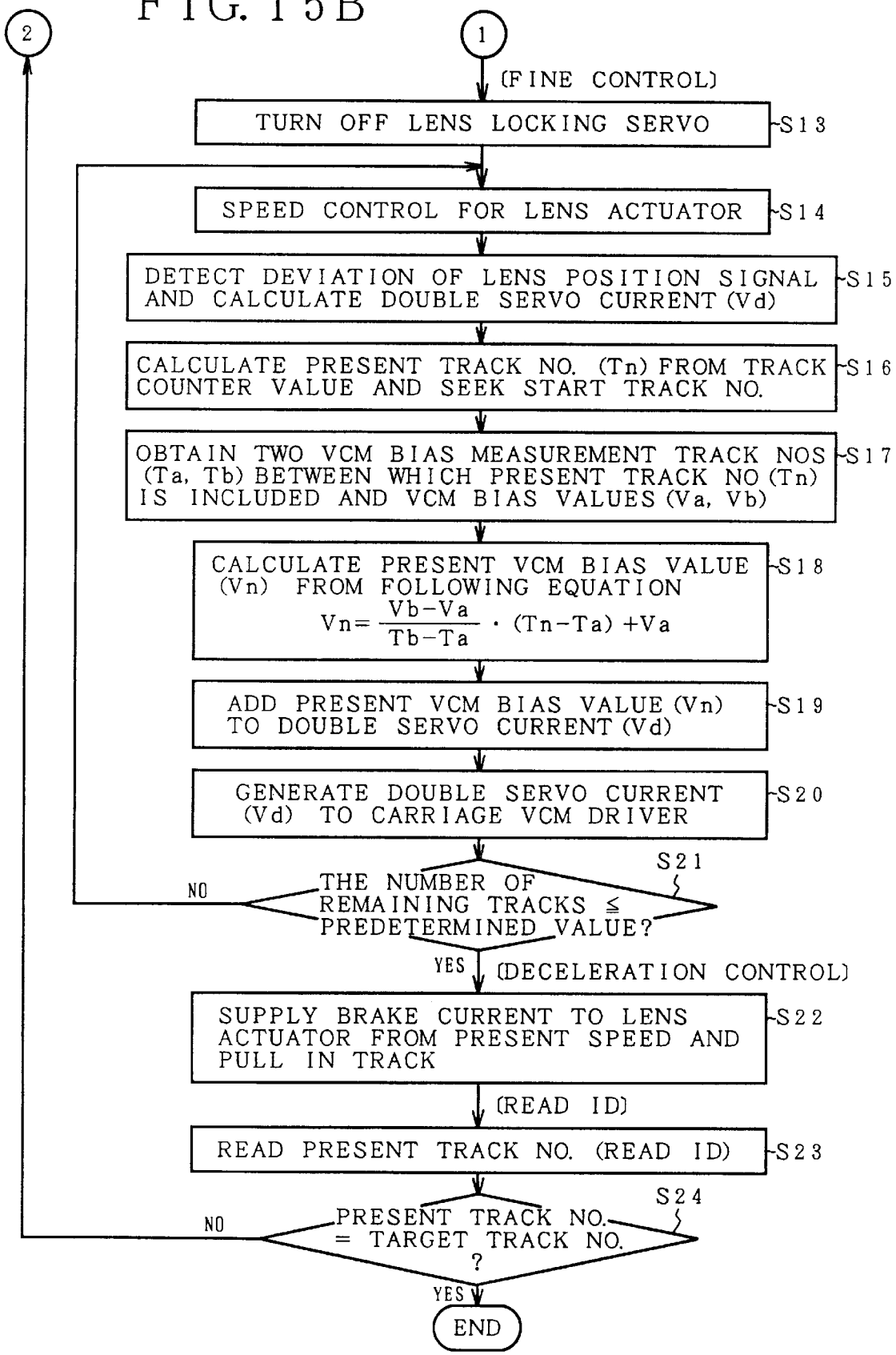

FIGS. 15A and 15B are flowcharts for a seek control after the measurement position table 145 was formed after completion of the measuring process by the bias current measuring unit 142 in FIGS. 10A and 10B. FIGS. 15A and 15B relate to processes in the control mode A in the bias current operating unit 146 for calculating the bias current of the present track number by the linear interpolation for the measurement position table 145, as a target, formed in the measuring mode 1 or 2. In FIG. 15A, when the target track number is recognized by the reception of a seeking command, the seek control is activated. First in step S1, the present track number is read and a difference between the present track number and the target track number is calculated, and after that, the seeking is started. First in step S2, the seeking mode is determined from the difference up to the target track number. When the difference is equal to or larger than a predetermined number of tracks, for example, 50 tracks, the processing routine advances to the coarse control in steps S3 to S12. On the other hand, when the difference is less than 50 tracks, the processing routine advances to the fine control after step S13 in FIG. 15B. Now, assuming that the difference is equal to or larger than the predetermined number of tracks, the coarse control is started. First, a specified acceleration current is supplied to the VCM 60 and the movement of the carriage is started. In association with it, the counting operation of the track counter 94 provided for the speed control circuit 90 in FIG. 10 is started in step S3. In step S4, the lens locking servo is turned on by turning on the servo switch 76. In step S5, the present speed is calculated by the speed operating unit 102 on the basis of the count result of the track counter 94. In step S6, a difference between the calculated present speed and the target speed generated at that time on the basis of the track difference is obtained at the addition point 106 and is multiplied with a predetermined gain by the gain setting device 108. The resultant value is set to the seek current Vs. A correcting process of the seek current is subsequently executed. Namely, the present track number Tn is calculated from the count value of the track counter 94 for an interval from the start of the seeking to the present time and the seek start track number in step S7. In step S8, with reference to the measurement position table 145 on the basis of the calculated present track number Tn, two measurement track numbers (Ta, Tb) on both sides between which the present track number Tn is included and two VCM bias values (Va, Vb) are obtained.

In step S9, the VCM bias value (Vn) of the present track number (Tn) is calculated by a linear interpolation by the following equation.

$$Vn = \{(Vb-Va)/(Tb-Ta)\} \cdot (Tn-Ta) + Va$$

In step S10, the VCM bias value (Vn) of the present track number (Tn) obtained is added to the seek current (Vs) at the addition point 148. In step S11, the corrected seek current (Vs) is outputted to the driver for the VCM 64. In step S12, the number of remaining tracks to the target track in order to switch the control mode to the fine control is checked. The processes in steps S5 to S11 are repeated until the number of remaining tracks is equal to or less than a predetermined value.

When the number of remaining tracks is equal to or less than the predetermined value in step S12, the processing routine advances to the fine control in steps S13 to S21 in FIG. 15B. In the fine control, the lens locking servo by the lens position servo circuit 66 is released by turning off the servo switch 76 in step S13. At the same time, the servo switch 112 is turned on, the servo switch 114 is turned off, the output of the speed control circuit 90 is switched to the lens actuator 60, and further, the servo switch 127 is turned on, thereby validating the double servo of the VCM 64 by the double servo circuit 118. In step S14, the speed control process by the speed control circuit 90 for the lens actuator 60 is executed. The speed control process is substantially the same as that in the case of the coarse control. The target speed according to the track difference to the target track at that time is generated by the target speed setting unit 100, the present beam speed is calculated at the addition point 106, and a speed deviation is derived. A speed control current is obtained by multiplying a gain G3' for the fine control to the speed deviation by the gain setting device 108, thereby controlling the speed of the lens actuator 60. In step S15, the deviation of the lens position signal is detected at the addition point 120 of the double servo circuit 118 and is multiplied with the gain G4 by the gain setting device 124, thereby calculating the double servo current (Vd). Subsequently, the calculated double servo current (Vd) is corrected by the VCM bias values. Namely, in step S16, the present track number (Tn) is calculated from the present track counter value and the seek start track number. In step S17, two measurement track numbers (Ta, Tb) between which the present track number (Tn) is included and two VCM bias values (Va, Vb) are obtained with reference to the measurement position table 145. In step S18, the VCM bias value (Vn) of the present track number (Tn) is calculated by the calculation of a linear interpolation. In step S19, the calculated VCM bias value (Vn) is added to the double servo current (Vd) at the addition point 116. In step S20, the corrected double servo current (Vd) is outputted to the rear side of the VCM 64 to drive the carriage. Such processes in steps S14 to S20 are repeated until the number of remaining tracks to the target track reaches a predetermined value to start the deceleration control in step S21. When the number of remaining tracks reaches the predetermined value, for example, 3 tracks in step S21, the control mode is switched to the deceleration control from step S22. In the deceleration control, in step S22, a brake current to be supplied to the lens actuator 60 is calculated from the present speed that is calculated at a zero-cross point interval of the tracking error signal at that time, the brake current calculated at a timing of a predetermined track position is supplied, for example, a position that is 0.5 track before the target track, and the light beam is pulled in to the target track by the deceleration control. After completion of the deceleration control, in step S23, the ID portion is read by a demodulation by the return light of the pull-in track and the present track number is read. In step S24, a check is made to see if the present track number which was read by the ID reading operation coincides with the target track number set by the seek command. When they coincide, the seeking operation is finished as a normality and the processing routine advances to an access for reading, writing, or the like. When the present track number doesn't coincide with the target track number, the processing routine is returned to step S1 in FIG. 15A and a retrying process is performed.

Figure 16A:
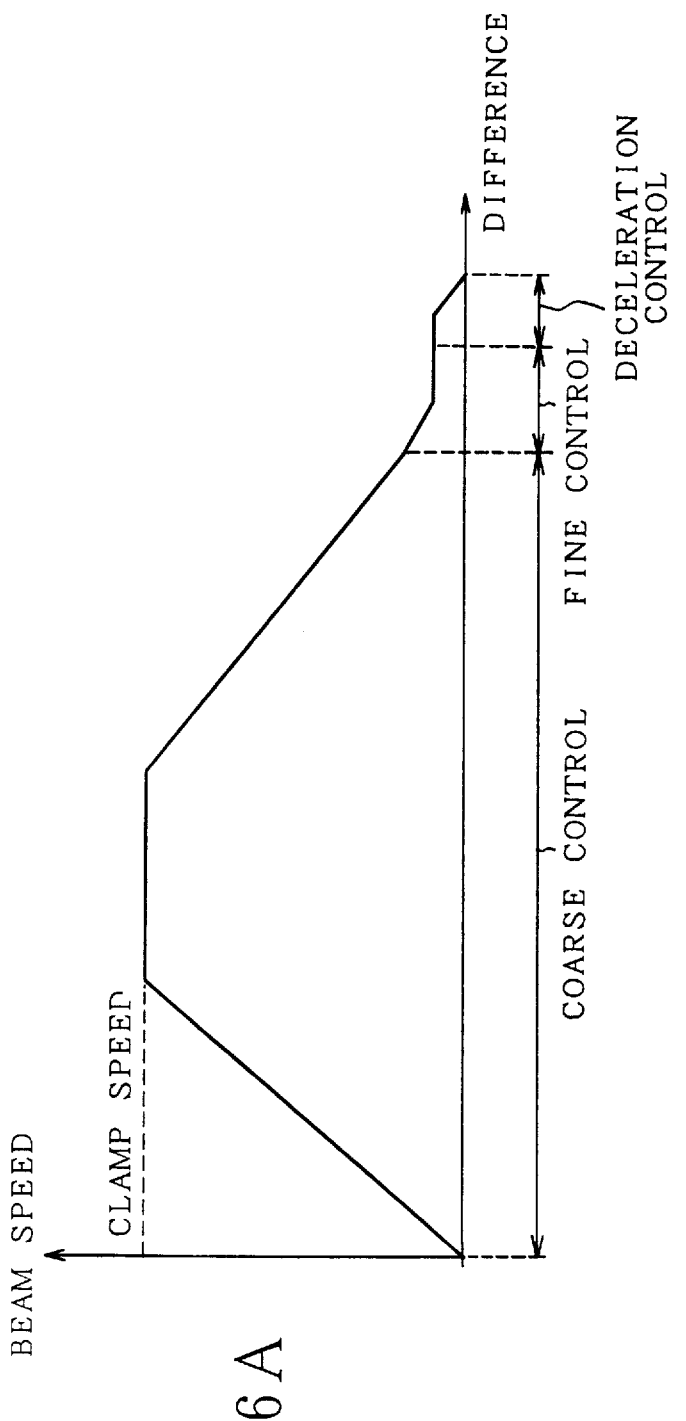
FIGS. 16A and 16B are time charts of a beam speed and a control mode in a long seeking mode and a short seeking mode according to FIGS. 15A and 15B.
Figure 16B:
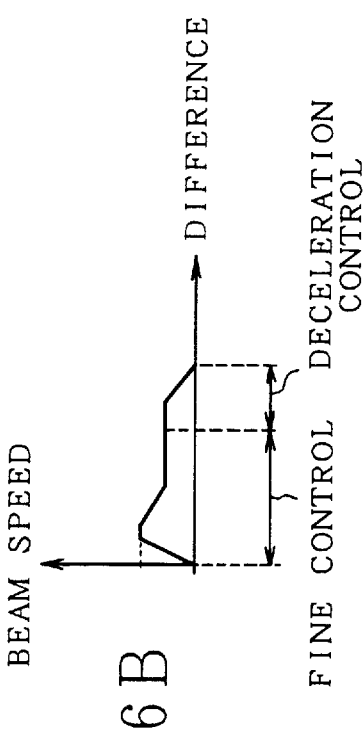

FIG. 16A is a time chart for the coarse control, fine control, and deceleration control in case of the long seek in the flowcharts in FIGS. 15A and 15B. On the other hand, when the difference between the present track and the target track is less than 50 tracks in step S2 in FIG. 15A, the processing routine advances to the fine control from step S13 in FIG. 15B and the seek control is started from the fine control. Processes in the fine control are also substantially similar to those in the case where the control mode is switched from the coarse control in the long seek to the fine control. The fine control and deceleration control shown in the time chart of FIG. 16B are executed.

Figure 17B:
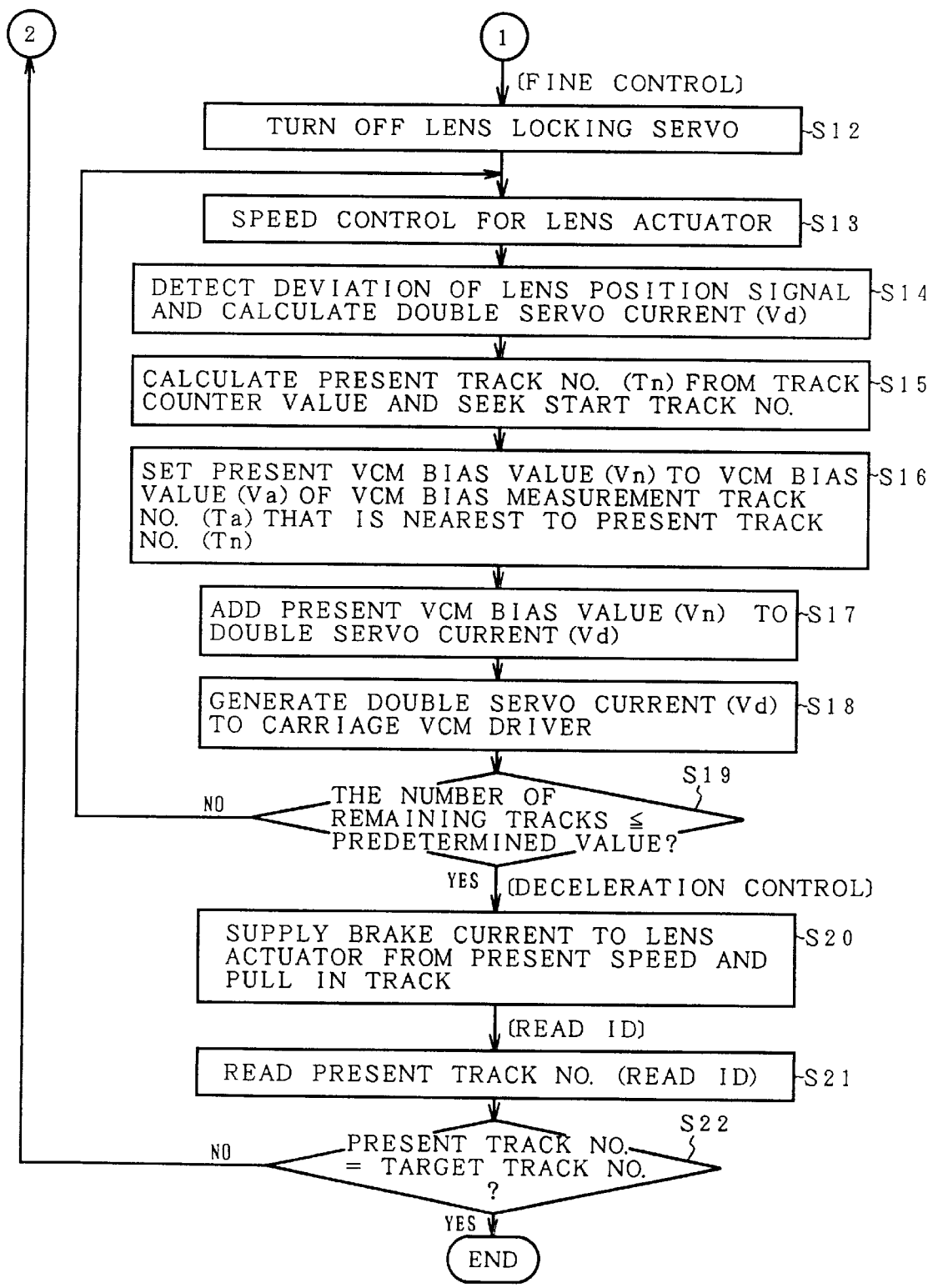

FIGS. 17A and 17B are flowcharts for the seek control in the control mode B in which the VCM bias value is selected from the value of the measurement track number that is closer to the present track number for the measurement position table 145, as a target, formed in the measuring mode 1 or 2 in FIGS. 10A and 10B and is constructed. In the seek control, a method of deciding the VCM bias value in step S8 in the coarse control in FIG. 17A and a method of deciding the VCM bias value in step S16 in the fine control in FIG. 17B are different from those in the control mode A in FIGS. 15A and 15B. Namely, in the coarse control in the control mode B in FIG. 17A, the VCM bias value (Va) of the measurement track number (Ta) that is closest to the present track number (Tn) is read out from the measurement position table 145 in step S8. In step S9, the read-out VCM bias value (Va) is added as a VCM value (Vn) of the present track number (Tn) to the seek current (Vs), thereby correcting. Similarly, with respect to the operation during the fine control as well, the VCM bias value (Va) of the measurement track number (Ta) that is closest to the present track number (Tn) is read out in step S16. In step S17, the read-out VCM bias value (Va) is added as a VCM bias value (Vn) of the present track number (Tn) to the double servo current (Vd), thereby correcting. The other processes are substantially the same as those in the flowchart of FIGS. 15A and 15B.

[Measuring modes 3 and 4 and control modes C and D]

Figure 18A:
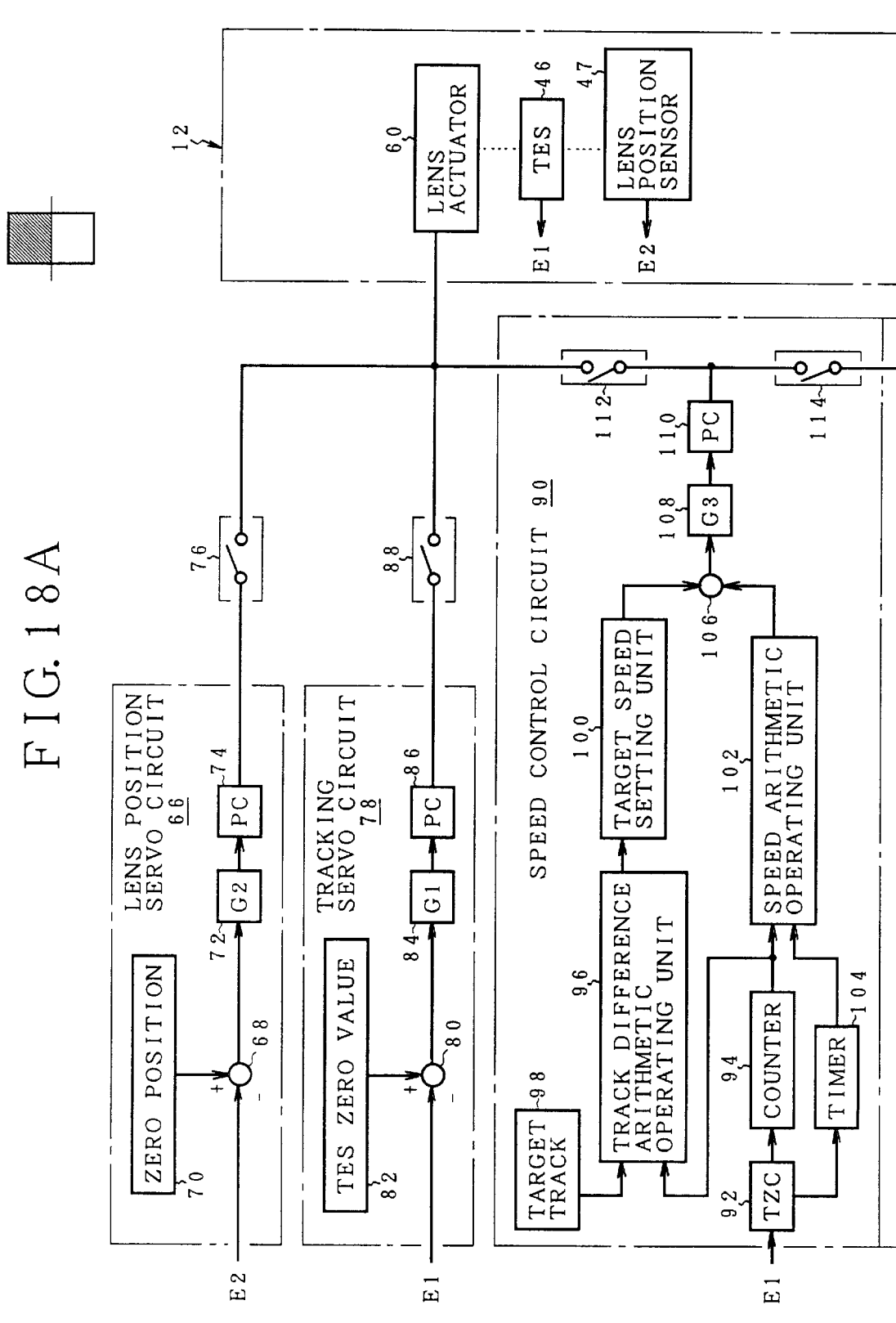
FIGS. 18A and 18B are functional block diagrams of a seek control unit of the invention corresponding to measuring modes 3 and 4.
Figure 18B:
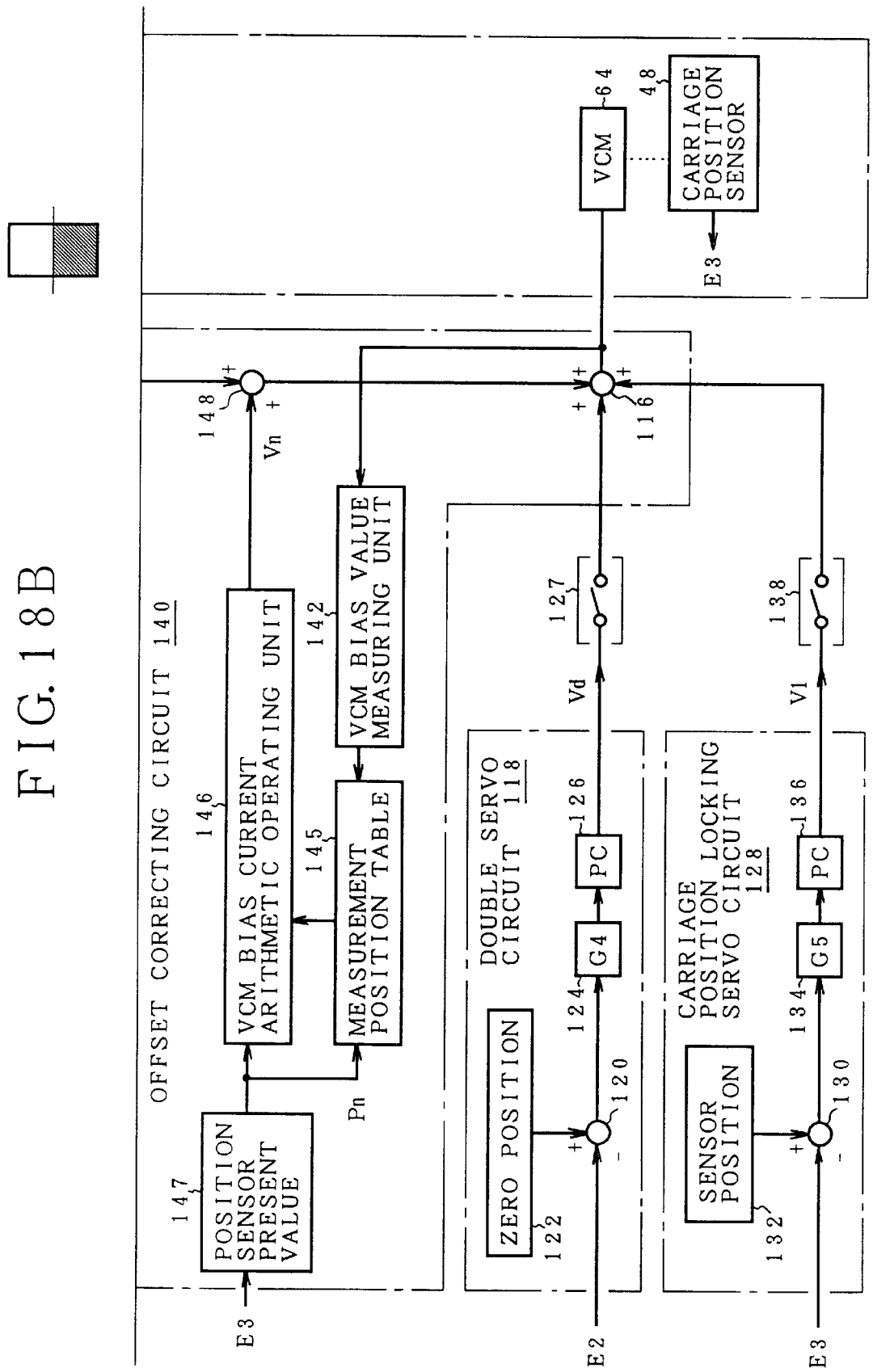

FIGS. 18A and 18B are functional block diagrams of an embodiment of the seek control unit 11 for performing the control modes C and D in FIG. 9 in which the measurement position table 145 is formed by the measuring mode 3 or 4 in which the measurement position in FIG. 8 is designated by the value of the carriage position sensor 48 and the seek current and double servo current are corrected during the seek control by using the measurement position table 145. The functional block diagrams are characterized in that different from the setting of the present track number in the measuring modes 1 and 2, the position sensor present value Pn based on the carriage position signal E3 of the carriage position sensor 48 to detect the absolute position of the carriage is set into the register 144 provided for the offset correcting circuit 140. Different from the designation of the measurement track number in case of the measuring modes 1 and 2, the measurement position table 145 in FIG. 19 in which the detecting position of the carriage position sensor 48 to detect the absolute position of the carriage is set to the measurement position is prepared for the bias current measuring unit 142. Twelve positions P1 to P12 have previously been stored as carriage positions in the measurement position table 145 in FIG. 19. In a state in which the carriage is moved to the carriage positions P1 to P12 and the positions are held and the currents for the VCM 64 at that time are measured and are stored as VCM bias current values V1 to V12, respectively. The other constructions are similar to those in FIGS. 10A and 10B.

Figure 20:
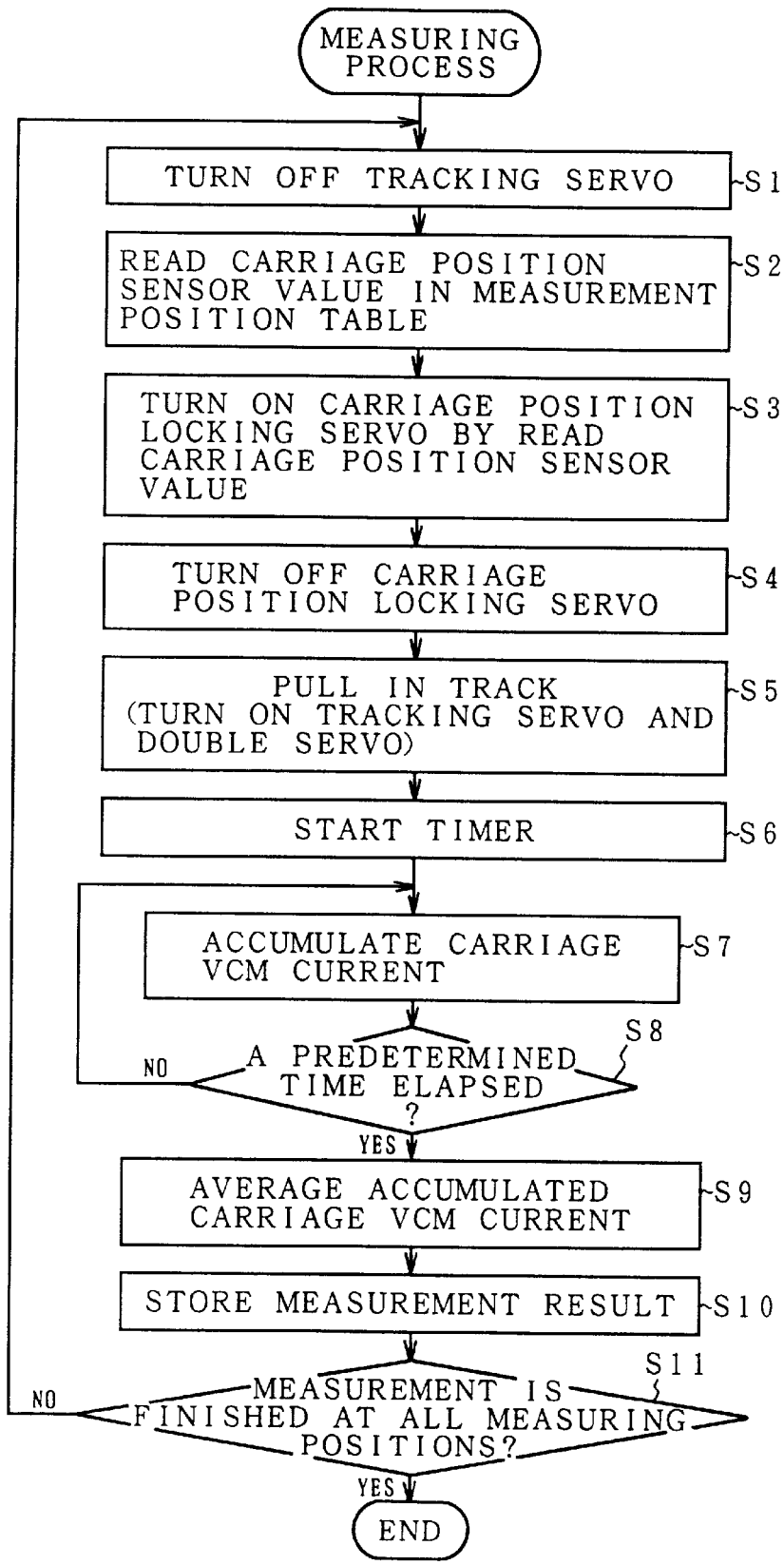
FIG. 20 is a flowchart for a measuring process in the measuring mode 3 of the invention.

FIG. 20 is a flowchart for a measuring process when the measuring mode 3 is designated in the bias current measuring unit 142 in FIGS. 18A and 18B. In the measuring process in the measuring mode 3, first in step S1, the servo switch 88 is turned off and a track tracing control of the lens actuator 60 by the tracking servo circuit 78 is released. Subsequently, with reference to the measurement position table 145 in step S2, the carriage position sensor value indicative of the first measurement position is read and set as a target sensor position into the register 132 of the carriage position locking servo circuit 128. The carriage position locking servo is turned on by turning on the servo switch 138. In this instance, in addition to the turn-off of the servo switch 88 of the tracking servo circuit 78, all of the other servo switches 76, 114, and 127 are turned off. Only the control of the carriage position locking servo of the VCM 64 by the carriage position locking servo circuit 128 is executed. When the carriage is moved to the target position in the register 132 in which the position deviation is set to zero by the driving of the VCM 64 by the carriage position locking servo and the position is locked, the carriage position locking servo is released by turning off the servo switch 138 in step S4. In step S5, the tracking servo circuit 78 is validated by the turn-on of the servo switch 88 and the double servo circuit 118 is validated by the turn-on of the servo switch 127, thereby performing a pull-in of the light beam to the target track. Thus, an on-track control for allowing the light beam to be pulled in and traced to the track at the measurement position is executed. In step S6, a timer is started. In step S7, the double servo current (Vd) which is supplied to the VCM 64 in this instance is sampled as a carriage VCM current and sampled values are accumulated. When a predetermined time elapses in step S8, the accumulated carriage VCM current is divided by the number of sampling times, thereby obtaining a mean value in step S9. In step S10, the measurement result is stored into the measurement position table 145. The above processes are repeated until the end of the measurement at all of the measurement positions in step S11.

FIG. 21 is a flowchart for a measuring process when the measuring mode 4 is designated in the bias current measuring unit 142 in FIGS. 18A and 18B. In the measuring process in the measuring mode 4, in a manner similar to the case of the measuring mode 3 in FIG. 20, the carriage is moved by the carriage position locking servo to the measurement position by the carriage position sensor value which was read out from the measurement position table 145 in steps S1 to S3 and the position is locked. After completion of the position locking, the timer is started in step S4 while maintaining the position locking state. In step S5, the carriage VCM current flowing in the VCM 64 of the carriage in the position locking state, namely, the position lock current is accumulated every sampling. When a predetermined time elapses in step S6, the accumulated carriage VCM current is divided by the number of sampling times, thereby averaging in step S7. The measurement result is stored into the measurement position table 145 in step S8. The above processes are repeated until the measurement at all of the measurement positions is finished in step S9.

Figure 22B:
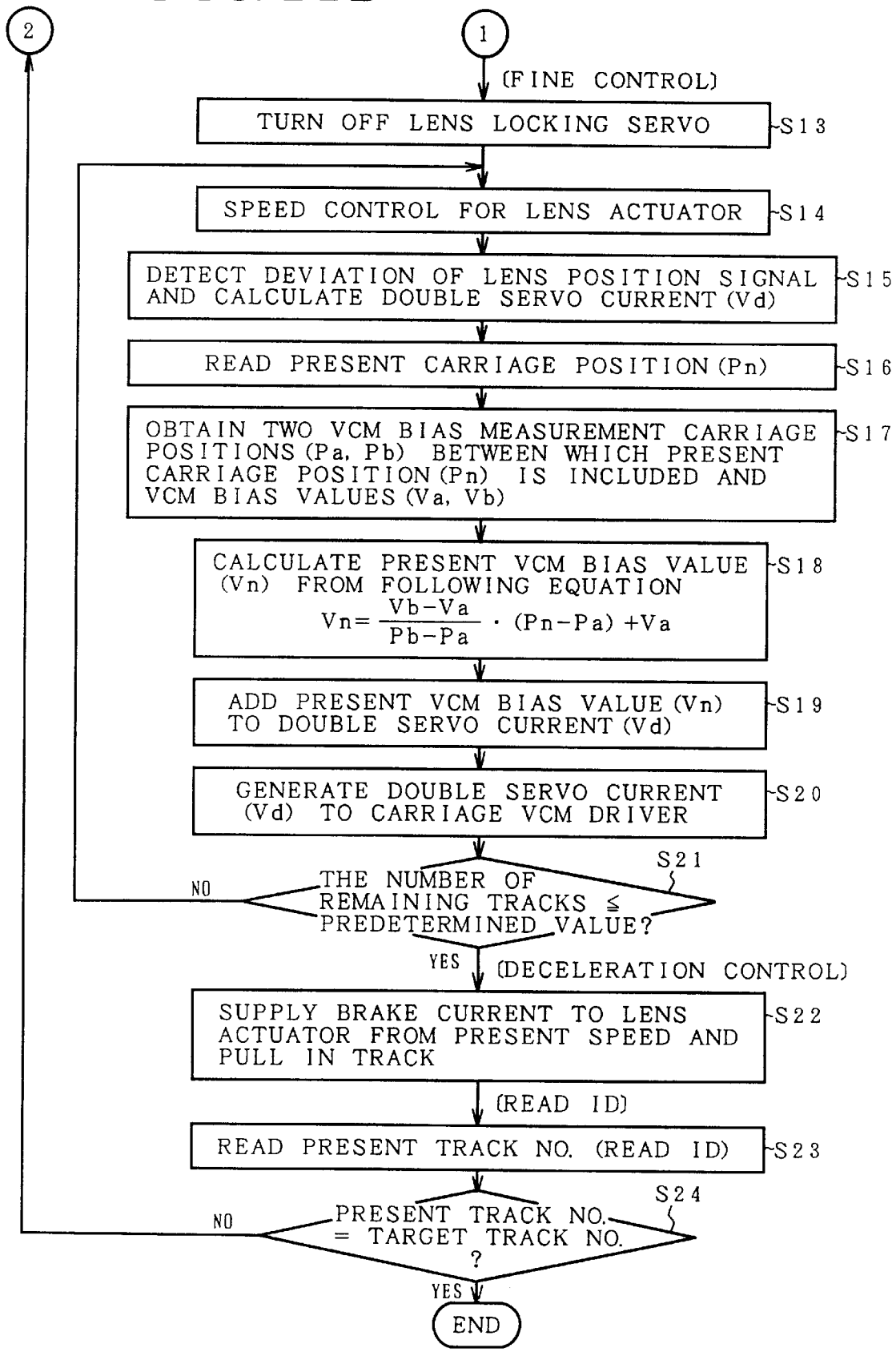

FIGS. 22A and 22B are flowcharts for the control mode C for executing the correction during the seeking operation using the measurement position table 145 formed in the measuring mode 3 or 4 by the bias current measuring unit 142 in FIGS. 18A and 18B. The control mode C is characterized in that the VCM bias value at the present position is obtained by a linear interpolation in a manner similar to the case of the control mode A in FIGS. 15A and 15B. Procedures of the seek start, coarse control, fine control, and deceleration control in the seek control in FIGS. 22A and 22B are fundamentally similar to those in FIGS. 15A and 15B. There is a difference between them with respect to a point that as for the fine control in steps S7 to S9 in the coarse control and the reference of the measurement position table 145 in steps S16 to S18, the present carriage position (Pn) and VCM bias measurement carriage positions (Pa, Pb) which can be detected by the carriage position sensor 48 are used instead of the track number.

Although the calculation of the VCM bias value (Vn) by the linear interpolation in steps S9 and S18 is also obviously different from that in FIGS. 15A and 15B with respect to a point that the measurement carriage positions (Pa, Pb) are used, the other points are substantially the same.

Figure 23A:
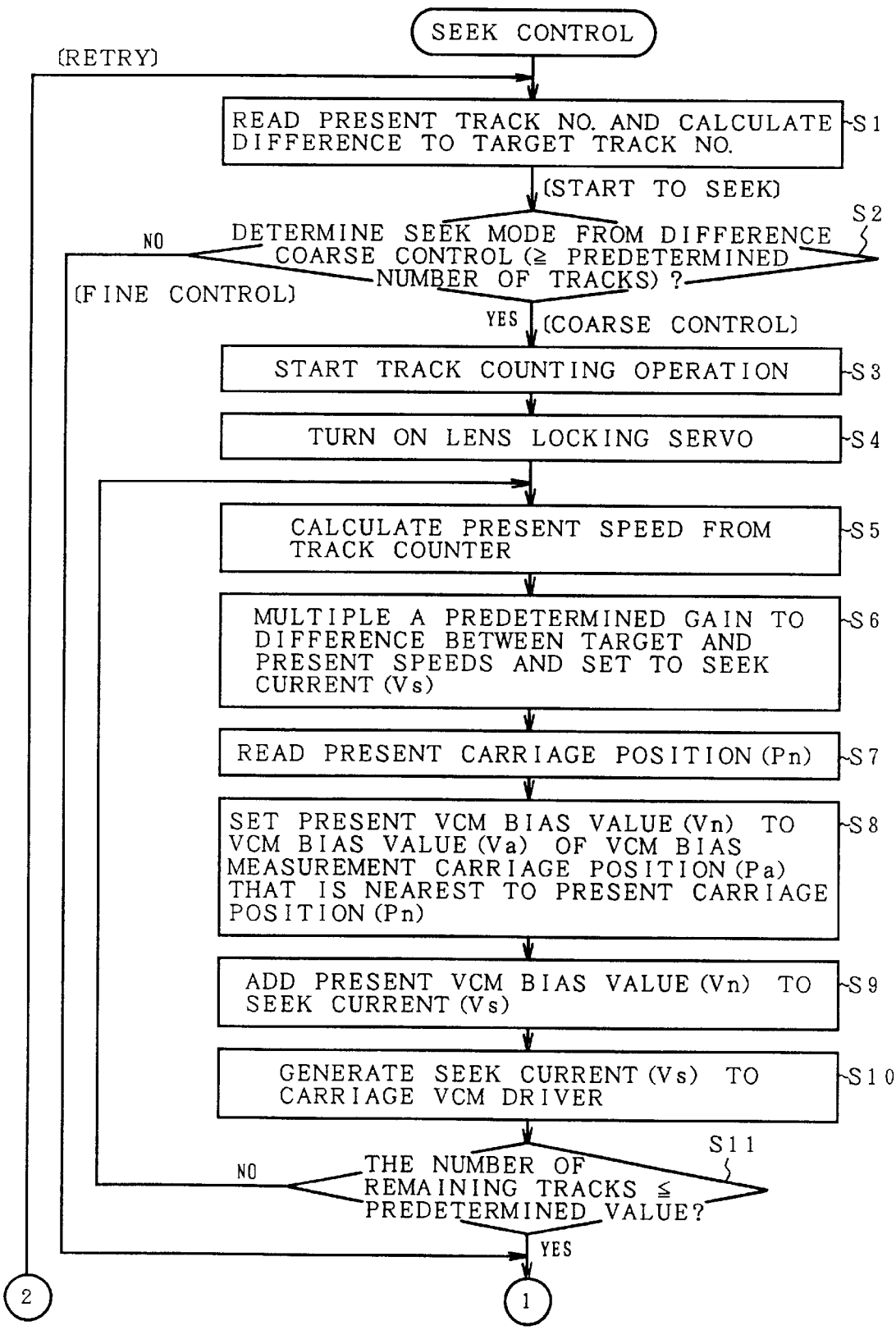
FIGS. 23A and 23B are flowcharts for a seek control of the invention according to a control mode D of an adjacent approximation corresponding to the measuring modes 3 and 4.
Figure 23B:
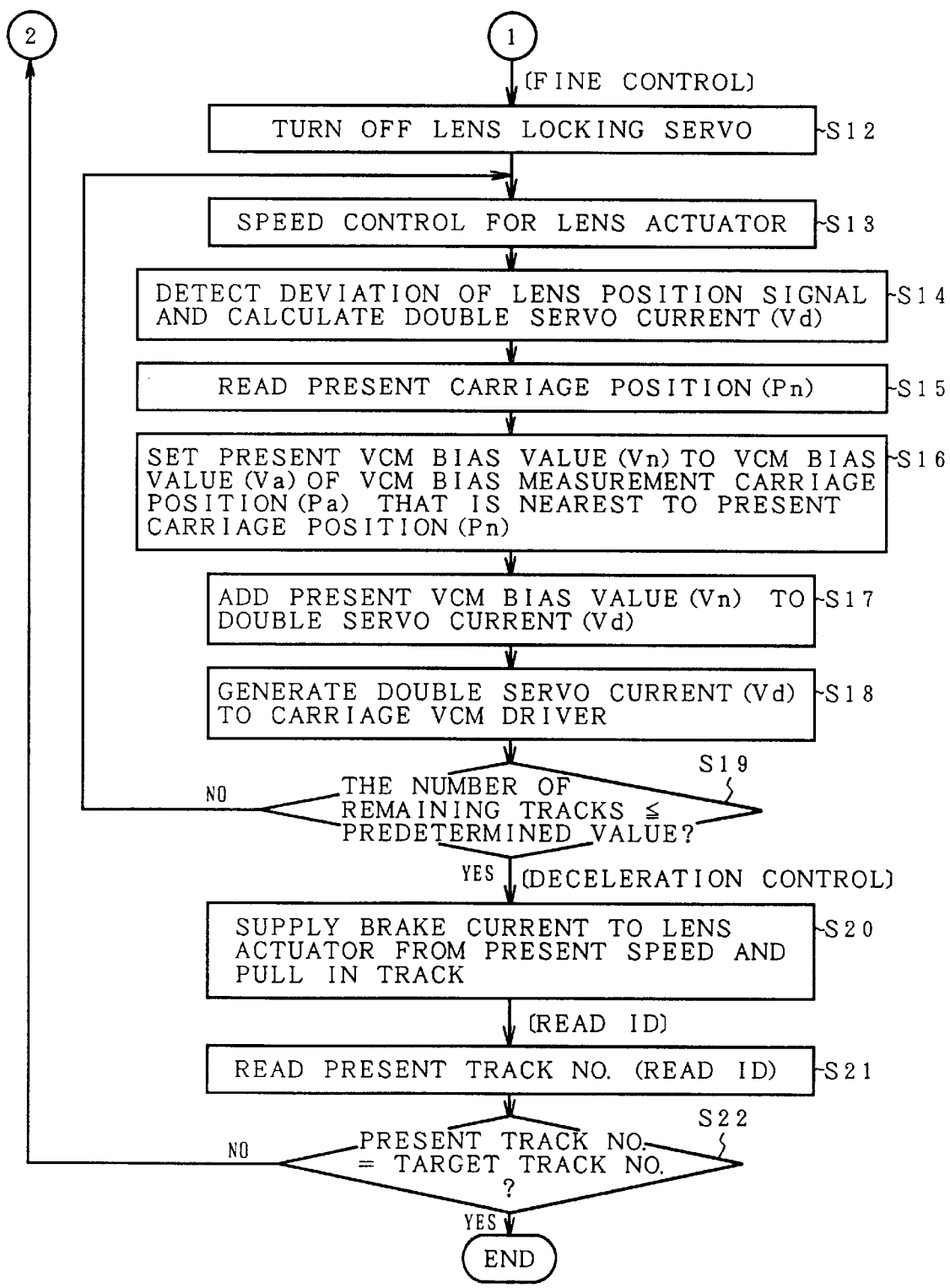

FIGS. 23A and 23B are flowcharts for a seek control in the control mode D in which the VCM bias value at the closest carriage measurement position is selected as an operation in the VCM bias current operating unit 146 with reference to the measurement position table 145 by the present carriage position by using the measurement position table 145 formed in the measuring mode 3 or 4 by the bias current measuring unit 142 in FIGS. 18A and 18B. The processes in the control mode D for the measuring mode 3 or 4 in FIGS. 23A and 23B as a target are fundamentally the same as the processes in the control mode B in FIGS. 17A and 17B in which the VCM bias value of the measurement track number that is closest to the present track number is likewise selected. They are different with respect to a point that in place of the track number (T), the carriage position (P) of the carriage position sensor 48 is used in steps S7 and S8 in the coarse control and steps S15 and S16 in the fine control in FIG. 23B.

[Other embodiments]

In the above embodiments, as shown in FIGS. 7A and 7B, the optical disk drive in which the lens position sensor 47 and carriage position sensor 48 are provided on the enclosure 12 side is considered as a target. However, the carriage position sensor 48 is not used in the measuring mode 1 in FIG. 8 and the lens position sensor 47 is not used in the measuring modes 2 and 4. Therefore, when the control mode A of the linear interpolation or the control mode B of the adjacent approximation is used in the measuring mode 1, an optical disk drive which doesn't have the carriage position sensor 48 to detect the absolute position of the carriage can be also used. As for the measuring modes 2 and 4, since the double servo based on the lens position sensor 47 is not executed in the state in which the carriage is locked at the measurement position, the lens position sensor 47 can be eliminated. However, during the coarse control to move the carriage by the speed control of the VCM 64, the lens position signal is necessary for a lens lock. Even during the fine control by the speed control of the lens actuator 60, the lens lock by the control of the VCM 64 due to the double servo is necessary. However, when the light beam is moving, by detecting an envelope of the tracking error signal E1 which is outputted from the tracking error signal detecting circuit 50 in association with the movement of the light beam, the lens position signal is falsely obtained. Namely, when an optical axial deviation of the objective lens occurs during the movement of the light beam, an offset according to the optical axial deviation occurs in the tracking error signal. By detecting the offset by the envelope detection of the tracking error signal, the lens position signal that is equivalent to that in case of providing the lens position sensor 47 can be falsely derived. Therefore, by using the pseudo lens position signal that is derived by the envelope detection of the tracking error signal, there is no need to provide the lens position sensor 47 for the lens actuator in FIG. 6. If there is no need to provide the lens position sensor 47 for the lens actuator, the structure of the lens actuator 60 can be simplified by only an amount of such a sensor and the optical disk drive can be further miniaturized and made thin.

In the above embodiments, in the adjusting step after the optical disk drive was manufactured, the measuring process of the VCM bias value is executed and the measured value is stored into the measurement position table. However, the friction between the bearing and the rail of the carriage and the tension due to the FPC band for connecting the base side with the carriage by signal lines are changed depending on an aging change or an environmental temperature in the apparatus during the use. Therefore, for example, as one of initialization diagnosing processes when a power source of the optical disk drive is turned on, a measuring process of the VCM bias value can be also performed. Similarly, the measuring process can be also executed at a predetermined timing in accordance with the elapse of time from the power-on.

According to the invention as described above, the carriage is moved to a predetermined measurement position, the bias current necessary to hold the position is measured and stored, the bias current corresponding to the present position of the carriage is obtained during the seeking, and the current to be supplied to the carriage actuator is corrected. Thus, a disturbance component due to the mechanical offset by the friction between the bearing and the rail of the carriage, the tension of the FPC band to connect the base side and the carriage by signal lines, and the like can be removed. Even if the weight of carriage is reduced in association with the miniaturization and thinning of the apparatus, the stable seeking operation can be performed without being influenced by the mechanical disturbance.

What is claimed is:

1. An optical storage apparatus comprising:
    a lens actuator for moving an objective lens to irradiate a light beam to a medium in a direction transverse to the tracks on said medium;
    a carriage actuator for moving a carriage on which said lens actuator is mounted in the direction transverse to the tracks on said medium;
    a seek control unit for moving said light beam to a target track position by driving said carriage actuator and said lens actuator;
    a storing unit for storing a bias current to remove a mechanical offset which is obtained by measuring a drive current flowing to said carriage actuator and applied to said carriage when said carriage is moved to a plurality of measurement positions in a radial direction of said medium and is held;
    a bias current operating unit for obtaining a corresponding bias current during a seeking operation by said seek control unit with reference to said storing unit on the basis of a present position of said carriage; and
    a correcting unit for correcting the drive current to said carriage actuator by said bias current obtained by said bias current operating unit.

2. An apparatus according to claim 1, further having a bias current measuring unit for measuring the drive current flowing to said carriage actuator when said carriage is moved to a plurality of measurement positions in the radial direction of the medium and for storing said drive current into said storing unit as a bias current to remove the mechanical offset that is applied to said carriage.

3. An apparatus according to claim 2, wherein in said bias current measuring unit:
    after positioning the light beam over a measurement track, a tracking servo of said lens actuator is turned on to thereby allow the light beam to trace the track, and at the same time, a double servo of said carriage actuator is turned on, and a double servo current is supplied to said carriage actuator so as to hold a position of said objective lens, which is detected by a lens position sensor, to a neutral position; and
    said double servo current is measured as said bias current and stored into said storing unit.

4. An apparatus according to claim 3, wherein said bias current operating unit reads out bias current values for measurement track numbers on either side of a present track number of the track which is being sought, said bias current values being read from said storage unit on the basis of said present track number, and said bias current operating unit calculates a bias current value of the present track number by a linear interpolation.

5. An apparatus according to claim 3, wherein said bias current operating unit refers to said storing unit by a present track number of a track which is being sought and selects a bias current value of the measurement track number which is closer to said present track number between two measurement track numbers, one said measurement track number on each side of said present track number.

6. An apparatus according to claim 3, wherein said bias current measuring unit measures the bias current of said carriage actuator at said measurement position a plurality of number of times and obtains a mean value.

7. An apparatus according to claim 2, wherein in said bias current measuring unit:
    after positioning the light beam over the measurement track, in a state in which a tracking servo of said lens actuator is turned off, a carriage position servo of said carriage actuator is turned on, and a position lock current is supplied to said carriage actuator so as to hold a detecting position of a carriage position sensor; and
    said position lock current is measured as said bias current and stored into said storing unit.

8. An apparatus according to claim 7, wherein said bias current operating unit reads out each bias current value of two measurement track numbers locating on both sides of a present track number of the track which is being sought with reference to said storing unit on the basis of said present track number and calculates a bias current value of the present track number by a linear interpolation.

9. An apparatus according to claim 7, wherein said bias current operating unit refers to said storing unit by a present track number of a track which is being sought and selects a bias current value of the measurement track number which is closer to said present track number between two measurement track numbers located on both sides of said present track number.

10. An apparatus according to claim 7, wherein said bias current measuring unit measures the bias current of said carriage actuator at said measurement position a plurality of number of times and obtains a mean value.

11. An apparatus according to claim 7, wherein said carriage position sensor detects an absolute position of the carriage which moves on a rail of a casing.

12. An apparatus according to claim 2, wherein in said bias current measuring unit:

a measurement position is designated, said carriage being moved to said measurement position by driving said carriage actuator using a carriage position servo;

after completion of the movement of the carriage to said measurement position, said carriage position servo is turned off and, at the same time, a tracking servo of said lens actuator is turned on to thereby allow said light beam to trace the track, and further, a double servo current is supplied to said carriage actuator so as to hold a position of said objective lens, which is detected by a lens position sensor, to a neutral position by turning on a double servo of said carriage actuator; and said double servo current is measured as said bias current and stored into said storing unit.

13. An apparatus according to claim 12, wherein said bias current operating unit refers to said storing unit on the basis of the present position which is detected by said carriage position sensor during the seeking operation, reads out each bias current value at measurement positions located on both sides of said present position, and calculates a bias current value at said present position by a linear interpolation.

14. An apparatus according to claim 12, wherein said bias current operating unit refers to said storing unit on the basis of the present position which is detected by said carriage position sensor during the seeking operation and selects a bias current value at the measurement position which is closer to the present position between measurement positions located on both sides of said present position.

15. An apparatus according to claim 12, wherein said bias current measuring unit measures the bias current of said carriage actuator at said measurement position a plurality of number of times and obtains a mean value.

16. An apparatus according to claim 12, wherein said carriage position sensor detects an absolute position of the carriage which moves on a rail of a casing.

17. An apparatus according to claim 2, wherein in said bias current measuring unit:

a measurement position is designated, said carriage being moved to said measurement position by a carriage position servo of said carriage actuator;

after completion of the movement of said carriage to said measurement position, a position lock current is supplied to said carriage actuator so as to hold the measurement position; and said position lock current is measured as said bias current and stored into said storing unit.

18. An apparatus according to claim 17, wherein said bias current operating unit refers to said storing unit on the basis of the present position which is detected by said carriage position sensor during the seeking operation, reads out each bias current value at measurement positions located on both sides of said present position, and calculates a bias current value at said present position by a linear interpolation.

19. An apparatus according to claim 17, wherein said bias current operating unit refers to said storing unit on the basis of the present position which is detected by said carriage position sensor during the seeking operation and selects a bias current value at the measurement position which is closer to the present position between the two measurement positions located on both sides of said present position.

20. An apparatus according to claim 17, wherein said bias current measuring unit measures the bias current of said carriage actuator at said measurement position a plurality of number of times and obtains a mean value.

21. An apparatus according to claim 17, wherein said carriage position sensor detects an absolute position of the carriage which moves on a rail of a casing.

22. An apparatus according to claim 2, wherein said bias current measuring unit measures a bias current in an adjusting step after the apparatus was completed and stores into said storing unit.

23. An apparatus according to claim 1, wherein during a coarse control in which the speed of said carriage actuator is controlled and, at the same time, the objective lens is locked to a neutral position by said lens actuator, said correcting unit adds the bias current value obtained by referring to said storing unit to a seek current which is supplied to said carriage actuator by said coarse control.

24. An apparatus according to claim 1, wherein during a fine control in which the speed of said lens actuator is controlled and, at the same time, the objective lens is locked to a neutral position by said carriage actuator, said correcting unit adds the bias current value obtained by referring to said storing unit to a double servo current which is supplied to said carriage actuator by said fine control.

25. An apparatus according to claim 1, wherein a nonvolatile memory in which contents are not deleted even when a power source of the apparatus is shut off is used as said storing unit for storing said measured bias current value.

* * * * *